(12) United States Patent
Wigren et al.

(10) Patent No.: US 8,717,924 B2
(45) Date of Patent: May 6, 2014

(54) METHOD AND ARRANGEMENT FOR LOAD MANAGEMENT IN HETEROGENEOUS NETWORKS WITH INTERFERENCE SUPPRESSION CAPABLE RECEIVERS

(75) Inventors: Torbjörn Wigren, Uppsala (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 124 days.

(21) Appl. No.: 13/306,483

(22) Filed: Nov. 29, 2011

(65) Prior Publication Data

US 2012/0140656 A1 Jun. 7, 2012

Related U.S. Application Data

(60) Provisional application No. 61/419,303, filed on Dec. 3, 2010.

(51) Int. Cl.
*H04J 1/16* (2006.01)
*H04L 12/56* (2006.01)

(52) U.S. Cl.
CPC .................... *H04L 47/10* (2013.01)
USPC ............... 370/252; 370/338; 455/63.1

(58) Field of Classification Search
USPC ............... 370/229–252, 310–350
See application file for complete search history.

(56) References Cited

U.S. PATENT DOCUMENTS

| | | | |
|---|---|---|---|
| 2002/0071508 A1* | 6/2002 | Takada et al. ............... | 375/346 |
| 2009/0207746 A1* | 8/2009 | Yuan et al. ............... | 370/252 |
| 2010/0214964 A1* | 8/2010 | Larsson et al. ............... | 370/277 |

FOREIGN PATENT DOCUMENTS

| | | |
|---|---|---|
| EP | 2053758 A1 | 4/2009 |
| WO | 2008/119216 A1 | 10/2008 |
| WO | 2011/031193 A1 | 3/2011 |

OTHER PUBLICATIONS

Wigren, T. et al. "Estimation of Uplink WCDMA Load in a Single RBS." 66th IEEE Vehicular Technology Conference, Sep. 30-Oct. 3, 2007.
Dahlman, E. et al. "Wider-Band 'Single-Carrier' Transmission." 3G Evolution, Second Edition: HSPA and LTE for Mobile Broadband, Elsevier Ltd., 2008, Chapter 5, p. 65.
Wigren, T. "Recursive Noise Floor Estimation in WCDMA." IEEE Transactions on Vehicular Technology, vol. 59, No. 5, Jun. 2010.

(Continued)

*Primary Examiner* — Kan Yuen
(74) *Attorney, Agent, or Firm* — Murphy, Bilak & Homiller, PLLC

(57) ABSTRACT

In a method of providing load measurements in an interference suppression capable radio base station node associated with a plurality of users in a heterogeneous wireless communication system, applying interference suppression to received signals in the radio base station node, to provide interference suppressed received signals. Subsequently, estimating neighbor cell interference based on the interference suppressed received signals, and estimating a reference received total wideband power, based on the interference suppressed received signals. Then performing the steps of determining a first load measure based on the interference suppressed received signals and the estimated reference received total wideband power, and determining a second load measure based on the interference suppressed received signals, the estimated reference received total wideband power and on the estimated neighbor cell interference.

25 Claims, 12 Drawing Sheets

(56) References Cited

OTHER PUBLICATIONS

Wigren, T. "Soft Uplink Load Estimation in WCDMA." IEEE Transactions on Vehicular Technology, vol. 58, No. 2, Feb. 2009.

Author Unknown. 3GPP TS 25.133, V6.10.0 (Jun. 2005). 3rd Generation Partnership Project; Technical Specification Group Radio Access Network; Requirements for support of radio resource management (FDD) (Release 6). Jun. 2005.

Lops, M. et al. "Narrow-Band-Interference Suppression in Multiuser CDMA Systems." IEEE Transactions on Communications, vol. 46, No. 9, Sep. 1998.

Tan, A. E.-C. et al. "Modeling the Effects of Interference Suppression Filters on Ultra-Wideband Pulses." IEEE Transactions on Microwave Theory and Techniques, vol. 59, No. 1, Jan. 2011.

* cited by examiner

METHOD AND ARRANGEMENT FOR LOAD MANAGEMENT IN HETEROGENEOUS NETWORKS WITH INTERFERENCE SUPPRESSION CAPABLE RECEIVERS

RELATED APPLICATION

This application claims priority under 35 U.S.C. §119 to U.S. Provisional Application No. 61/419,303 filed Dec. 3, 2010.

TECHNICAL FIELD

The present invention concerns load management in wireless communication systems, in particular load management in interference suppression capable heterogeneous wireless communication systems.

BACKGROUND

Present day wireless communication systems, such as WCDMA (Wideband Code Division Multiple Access) continue to evolve to support high bit rate applications. As data rates increase, so does interference and self-interference from the dispersive radio channels, which in turn severely limits performance. In order to combat these problems, advanced receivers for WCDMA terminal platforms and base stations are continually being developed and further improved. Consequently, in future versions of mobile communication systems like WCDMA, Interference Suppression (IS) will be used in order to achieve better performance in terms of e.g. peak data rates, coverage, system throughput and system capacity.

Future cellular networks can also be expected to become more and more heterogeneous in terms of wireless devices, deployed radio network nodes, traffic demand and service types, and radio access technologies.

The interest in deploying low-power nodes (such as pico base stations, home eNodeBs, relays, and remote radio heads) for enhancing the macro network performance in terms of the network coverage, capacity and service experience of individual users has been constantly increasing over the last few years, although radio network nodes of different power classes have existed for a longer time. With the increased interest in such deployments, it has also been realized that there is a need for enhanced interference management techniques. This is useful to address the arising interference issues caused, for example, by a significant transmit power variation among different cells and cell association techniques developed earlier for more uniform networks. This problem has not been that crucial earlier since lower-power nodes have been used mostly in indoor environments for coverage enhancement of cellular networks and therefore there has been a good isolation from the interference caused by macro-layer transmissions. Nowadays, such nodes are also considered for outdoor deployments and for capacity enhancement in general.

In 3GPP (Third Generation Partnership Project), heterogeneous network (HETNET) deployments have been defined as deployments where low-power nodes of different transmit powers are placed throughout a macro-cell layout, to cope with a non-uniform traffic distribution. Examples of such nodes are pico-, micro-, and femto-base stations as well as relay nodes, or any mix of them. Such deployments are, for example, effective for capacity extension in certain areas, so-called traffic hotspots, i.e. small geographical areas with higher user density and/or higher traffic intensity where installation of pico-nodes can be considered to enhance performance. Heterogeneous deployments may also be viewed as a way of densifying networks to adopt for the traffic needs and the environment. However, heterogeneous deployments also bring challenges for which the network has to be prepared to ensure efficient network operation and superior user experience. This is because the mix of these different nodes introduces interaction between the cells in new ways, in particular, in reuse-one networks where the inter cell isolation is poor. The air interface load interaction becomes particularly difficult in heterogeneous networks of WCDMA type, equipped with so-called IS receivers.

To illustrate what may happen, consider a low power cell with limited coverage intended to serve a hotspot. In order to get a sufficient coverage of the hotspot an interference suppressing receiver is used. The problem is now that the low power cell is located in the interior of and at the boundary of a specific macro cell. Further, surrounding macro cells also interfere with the low power cell rendering a high level of neighbor cell interference in the low power cell, that despite the advanced receiver reduces the coverage to levels that do not allow a coverage of the hotspot, even if the transmissions in low-power cells (either downlink DL or uplink UL) are at the maximum power level which will in turn only further increase interference from macro cells since they too have to overcome higher interference from neighbors. As a result, users of the hotspot are connected to the surrounding macro cells, thereby further increasing the neighbor cell interference experienced by the low power cell.

From this discussion, it should be clear that it would be advantageous if the radio network control node (RNC) could be informed of the interference situation and take action, using e.g. admission or congestion control to reduce neighbor cell interference and to provide a better management of the hotspot traffic—in terms of air interface load.

A first problem is that there are no publicly available estimation methods known from prior art that allow an estimation of the neighbor cell interference after IS processing. A second problem is that there are no methods for estimation of the associated air-interface load after IS processing either. Thirdly, there are no means in the 3GPP standard for signaling of neighbor cell interference between the radio base station (RBS) and the RNC of the WCDMA system. Fourthly, there are no detailed algorithm known in prior art that are responsive to the load effect of neighbor cell interference, after IS processing, in the RNC. A fifth problem is that the only available neighbor cell interference management means is the relative grant and this mechanism is only available for cells in soft(er) handover with the user equipment (UE). On top of this, the relative grant can only provide a one-step grant reduction.

Consequently, there is a need for methods of enabling providing load measurements that take interference suppression into account, and to enable performing admission control based on the interference suppression affected load measurements.

SUMMARY

The present disclosure aims to obviate some of the above-mentioned problems, and to provide improved load management in interference suppression capable heterogeneous wireless communication systems.

According to a first aspect, the present disclosure presents a method of providing load measurements in an interference suppression capable radio base station node associated with a plurality of users in a heterogeneous wireless communication system. The method presents the steps of applying, in the radio base station node, interference suppression to received signals in the radio base station node, to provide interference suppressed received signals, and estimating neighbor cell interference based on the interference suppressed received signals. Further, the method presents the steps of estimating, in the radio base station node, a reference received total wideband power, based on the interference suppressed received signals. In addition, the method presents the additional steps of determining, in the radio base station node, a first load measure based on the interference suppressed received signals and the estimated reference received total wideband power, and determining a second load measure based on the interference suppressed received signals, the estimated reference received total wideband power, and the estimated neighbor cell interference.

According to a second aspect, the present disclosure presents method of load management in a radio network control node associated with at least one interference suppression capable radio base station node in a heterogeneous wireless communication system. The method presents the steps of receiving a first load measure, a second load measure, and an estimated reference received total wideband power from a radio base station node in the system. In addition, the method presents the subsequent step of reconstructing neighbor cell interference in the radio base station node based on the received first and second load measures and the estimated reference received total wideband power. Finally, the method presents a step of performing load management in the radio base station node based on at least one of the reconstructed neighbor cell interference level and the at least first and second load measure.

According to a third aspect, the present disclosure presents an arrangement for providing load measurements in an interference suppression capable radio base station node associated with a plurality of users in a heterogeneous wireless communication system. The arrangement includes an interference suppression unit configured to apply interference suppression to received signals in the radio base station node, to provide interference suppressed received signals. In addition, the arrangement includes a neighbor cell interference estimator unit configured for estimating neighbor cell interference based on the interference suppressed received signals, and a reference received total wideband power estimator unit configured for estimating a reference received total wideband power, based on the interference suppressed received signals. Further, the arrangement includes a first load measure determining unit configured for determining a first load measure based on the interference suppressed received signals and the estimated reference received total wideband power, and a second load measure determining unit configured for determining a second load measure based on the interference suppressed received signals, the estimated reference received total wideband power, and the estimated neighbor cell interference.

According to a fourth aspect, the present disclosure presents an arrangement for load management in a radio network control node associated with at least one interference suppression capable radio base station node in a heterogeneous wireless communication system. The arrangement presents a receiving unit configured for receiving a first load measure and a second load measure and an estimated reference received total wideband power from at least one radio base station node in the system. Further, the arrangement includes a reconstructing unit configured for reconstructing neighbor cell interference in the at least one radio base station node based on the first and second load measures and on the estimated reference received total wideband power. Finally, the arrangement presents an admission control unit configured for performing load management in the at least one radio base station node based on at least one of the reconstructed neighbor cell interference level and the at least first and second load measure.

Advantages of the present disclosure include enabling measurement of load in terms of rise over thermal and noise rise after interference suppression processing, and managing load on the uplink based on the load situation after interference suppression processing. Further, the present disclosure enables signaling of rise over thermal and noise rise values reusing already existing signaling of received total wideband power and noise floor estimates.

BRIEF DESCRIPTION OF THE DRAWINGS

The invention, together with further objects and advantages thereof, may best be understood by referring to the following description taken together with the accompanying drawings, in which.

DETAILED DESCRIPTION

Figure 1:
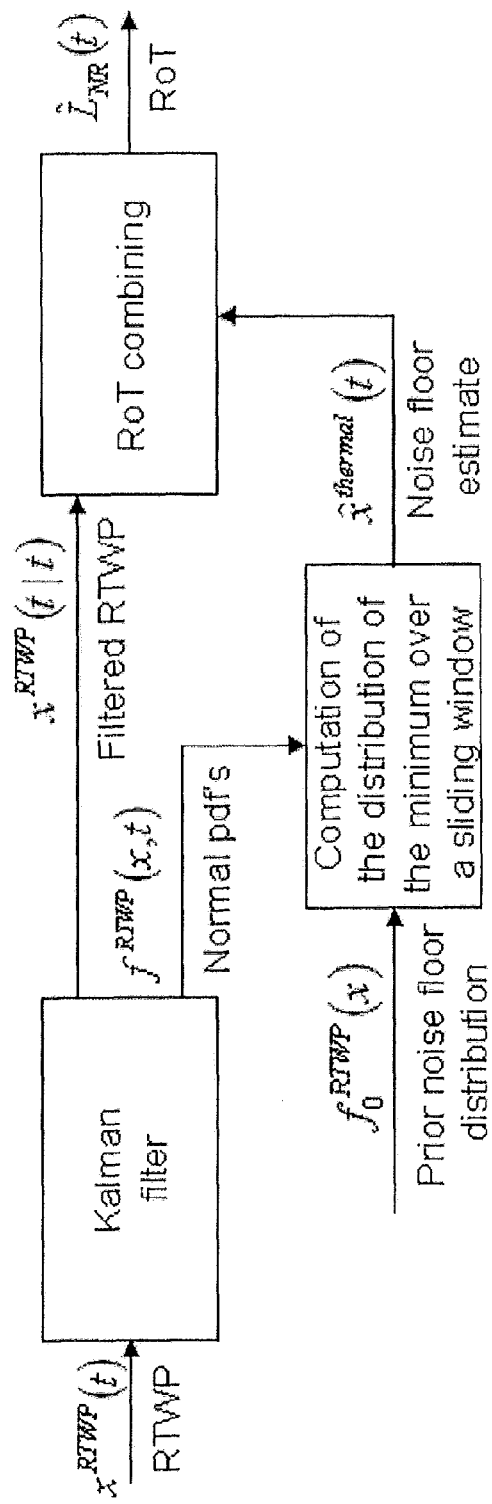
FIG. 1 is a schematic flow diagram of a method of rise over thermal estimation.

Throughout the drawings, the same reference numbers are used for similar or corresponding elements.

The present disclosure is described in the context of a WCDMA wireless communication system. In particular, the disclosure concerns the impact of the introduction of interference suppression capable receivers in such systems on load measurements and congestion control e.g. interference congestion control, in such systems. Examples of interference suppressing receivers that are important for the present disclosure include a plurality of linear receivers, e.g. G-rake+ (generalized rake+), FDE (frequency domain equalization) and FDPE (frequency domain pre equalization) receivers.

The inventor has identified the need for providing load measures after interference suppression processing in IS capable receivers e.g. G-Rake+, FDPE, FDE receivers, as well as a need for utilizing those load measures in order to effectively control admission.

For prior art receivers without interference suppression or interference cancellation capabilities, a load at the antenna connector is given by the so-called rise over thermal. For further information concerning load measurements in present day systems without interference suppression capable receivers e.g. Rake receivers, the interested reader is guided towards Annex A, together with FIG. 1 of this disclosure. In short, the fingers of a Rake receiver extract signal energy from delayed signal images by despreading and combining them. The Rake receiver coherently combines the finger outputs using complex conjugates of estimated channel coefficients to estimate the modulation symbols. Each despread value consists of a signal component, an interference component, and a noise component. When combining the values, the Rake receiver aligns the signal components so that they add to one another. As data rates increase, greater self-interference from dispersive radio channels limit performance. In order to handle self-interference the so called a G-rake (Generalized Rake) receiver has been developed, which functions like an equalizer, suppressing self-interference.

In a G-Rake receiver, in contrast to a plain Rake receiver, extra interference fingers are user to collect information about interference on the signal fingers. This is used to cancel interference in the signal fingers. In addition to estimating the channel, the G-Rake receiver estimates the correlations between the interference plus noise on different fingers. This information is used to suppress interference. The channel estimate and interference plus noise correlation estimates are used to form the combining weights. As a result the combining process collects signal energy and suppresses interference. Consequently, the G-Rake receiver combines the despread values to cancel interference and increase the signal component, whereas the normal Rake receiver only maximizes the signal component.

A particular form of G-Rake receiver is the so-called G-Rake+. To explain the difference between the two receiver concepts, it is noted that they only differ in the way the impairment matrix R_u is computed. The G-Rake is also denoted the parametric G-Rake, which points to the fact that the impairment matrix is estimated via a model believed to be relevant for the case. The G-Rake+ receiver is in contrast also denoted the non-parametric G-Rake. In this case, the impairment matrix is estimated from measurements of an unused uplink code i.e. a code that is not used for data transmission of any user in the cell. In this manner the energy on this code represents a mix of transmissions from neighbor cells and energy "leaking" from the transmission of the own cell. The assumption is that this energy is representative of the interference experienced by the users of the cell. Experiments indicate that this is a valid assumption. The contributions from the unused code are first despread and then rank 1 contributions from a number of symbols are summed up to give R_u.

In order to provide an insight to the above mentioned problems associated with interference suppression capable receivers, a detailed description of three different examples of linear receivers, e.g. G-rake+. FDPE. FDE receivers, follow below.

A first example of such an interference suppression capable linear receiver is the G-rake+ receiver. The difference with an interference suppressing G-rake+ receiver as compared to a conventional Rake receiver is that each user sees a reduced level of interference, immediately after the weight combining step. In a G-rake+ receiver, a covariance matrix $\hat{R}_u$, u=1, ..., U, with the order equal to the number of fingers is first estimated to capture the interference. The spreading codes not used by the present user u may be used in order to estimate $\hat{R}_u$.

The G-rake+ receiver uses the estimated covariance matrix that models the interference for computation of the combining weights for the users u, u=1, ..., U, according to Equation 1 below:

$$\hat{R}_u \hat{w}_u = \hat{h}_u, u=1,\ldots,U, \quad (1)$$

where $\hat{h}_u$, u=1, ..., U, is the net channel response of user u and where $\hat{w}_u$ are the combining weights.

The effect of Equation 1 is that the G-rake+ receiver essentially whitens the correlated interference and removes large spectral peaks from interferers at certain finger locations and for certain antenna elements.

Note that the G-rake+ receiver is an example of a linear receiver. There is a related type of IS receiver for WCDMA which is also linear, denoted the chip equalizer. The difference between the G-rake+ receiver and the chip equalizer is the order of certain basic operations.

Figure 2:
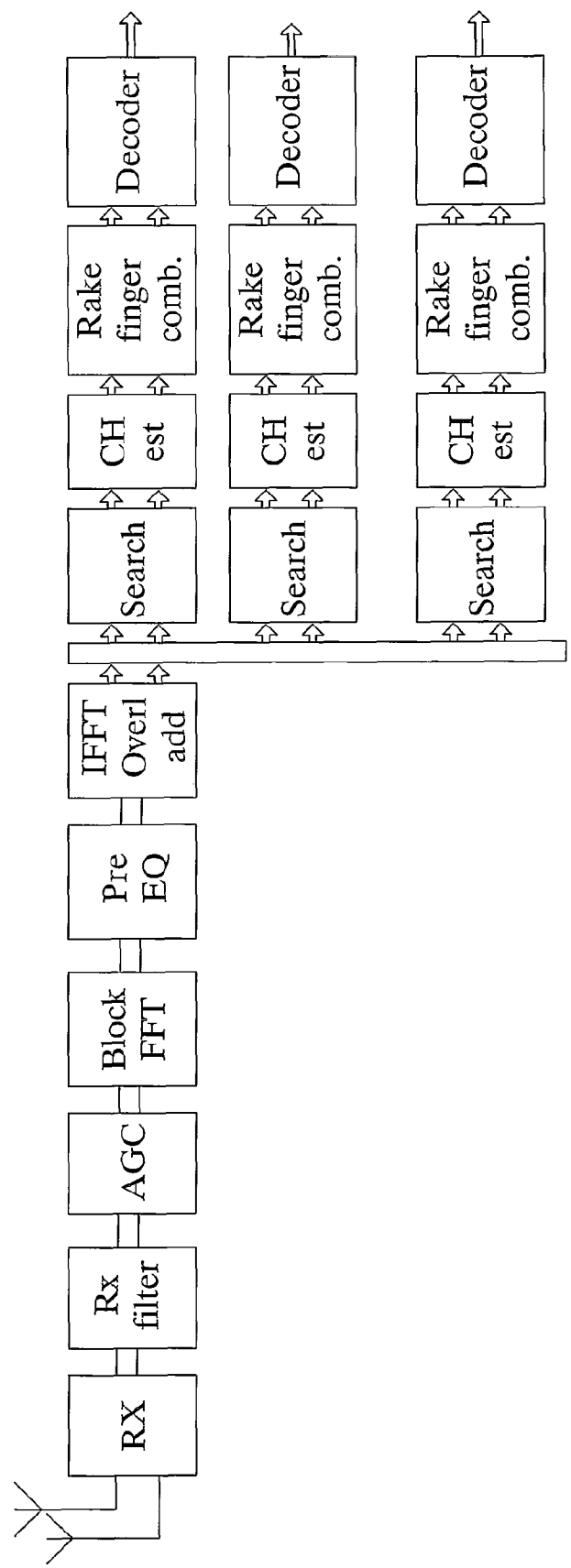
FIG. 2 is a schematic block diagram of an FDPE receiver.

A further example of an interference suppression capable receiver is the so-previously mentioned FDPE receiver. The FDPE receiver structure is depicted in FIG. 2. The blocks named "Block FFT", "Pre-EQ", and "IFFT Overlap-add" are added to the existing uplink WCDMA receiver structure without IS. The main advantages associated with this structure include the following:

The FDPE structure gives significant IS gains. It is not clear today if the gains are as large as those achieved with the G-rake+ structure.

The FDPE structure achieves IS for all users simultaneously, thereby reducing the computational complexity as compared to the G-rake+ structure that performs processing individually for all users.

Processing blocks are inserted in the uplink receiver structure that is already in place—thereby reducing development costs.

The fast Fourier transform (FFT) accelerator hardware developed for LTE (Long Term Evolution) can be reused, thereby creating further synergies.

The FDPE receiver algorithm performs interference whitening in the frequency domain. To explain this in detail, the time domain signal model in Equation 2 can be used:

$$v(t) = \sum_{l=0}^{L-1} h(l)z(t-l) + \eta_v(t). \quad (2)$$

Here, v is the received (vector due to multiple antennas) signal, with chip sampling rate, h is the radio channel net response, z is the desired (transmitted) signal and $\eta_v$ denotes thermal noise and interference, t denotes discrete time.

Taking the Fourier transform, Equation 2 is translated into Equation 3:

$$V(m)=H(m)Z(m)+N(m), \quad (3)$$

where the capital letter quantities are the discrete Fourier transform of the corresponding quantities in Equation 2. Now a whitening filter can be applied in the frequency domain. It is well known that the filter that minimizes the mean square error (the MMSE solution) is given by Equation 4 below:

$$W_{MMSE}(m) = \left(\hat{R}_d(m)\right)^{-1} \hat{H}(m) = \begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0}(m) & & & R_{N_r-1,N_r-1}(m) \end{bmatrix}^{-1} \begin{bmatrix} \hat{H}_0(m) \\ \hat{H}_1(m) \\ \vdots \\ \hat{H}_{N_r-1}(m) \end{bmatrix} \quad (4)$$

where $\hat{R}_d(m)$ is an estimate of the covariance matrix of V(m).

This estimate of the covariance matrix can e.g. be obtained as an average over N different data blocks:

$$\hat{R}_d(m) = \frac{1}{N}\sum_{k=0}^{N-1} V_k(m)V_k^H(m). \quad (5)$$

Using a so-called Cholesky decomposition the covariance matrix between the antenna elements can be factored according to Equation 6:

$$L(m)\cdot L^H(m) = \hat{R}_d(m). \quad (6)$$

The idea behind the FDPE receiver is to exploit this factorization and write:

$$W_{MMSE}(m) = (L^H(m))^{-1}((L(m))^{-1}\hat{H}(m)) = W_{pre}(m)((L(m))^{-1}\hat{H}(m)), \quad (7)$$

so that the desired signal in the frequency domain becomes MMSE pre-equalized in the frequency domain, i.e. given by Equation 8 below:

$$Z_{pre}(m) = W_{pre}(m)V(m). \quad (8)$$

This is a user independent processing, which is the same for all users. Hence the wideband received signal is transformed to the frequency domain and the covariance matrix is computed and Cholesky factored, after which Equation 13 is computed. The signal is then transformed back to the time domain where it is further processed for each user. Note that the channels experienced by the RAKE receivers in this processing are obtained from the second factor of Equation 6. The FFT and IFFT blocks have low computational complexity and are preferably implemented in hardware.

Figure 3:
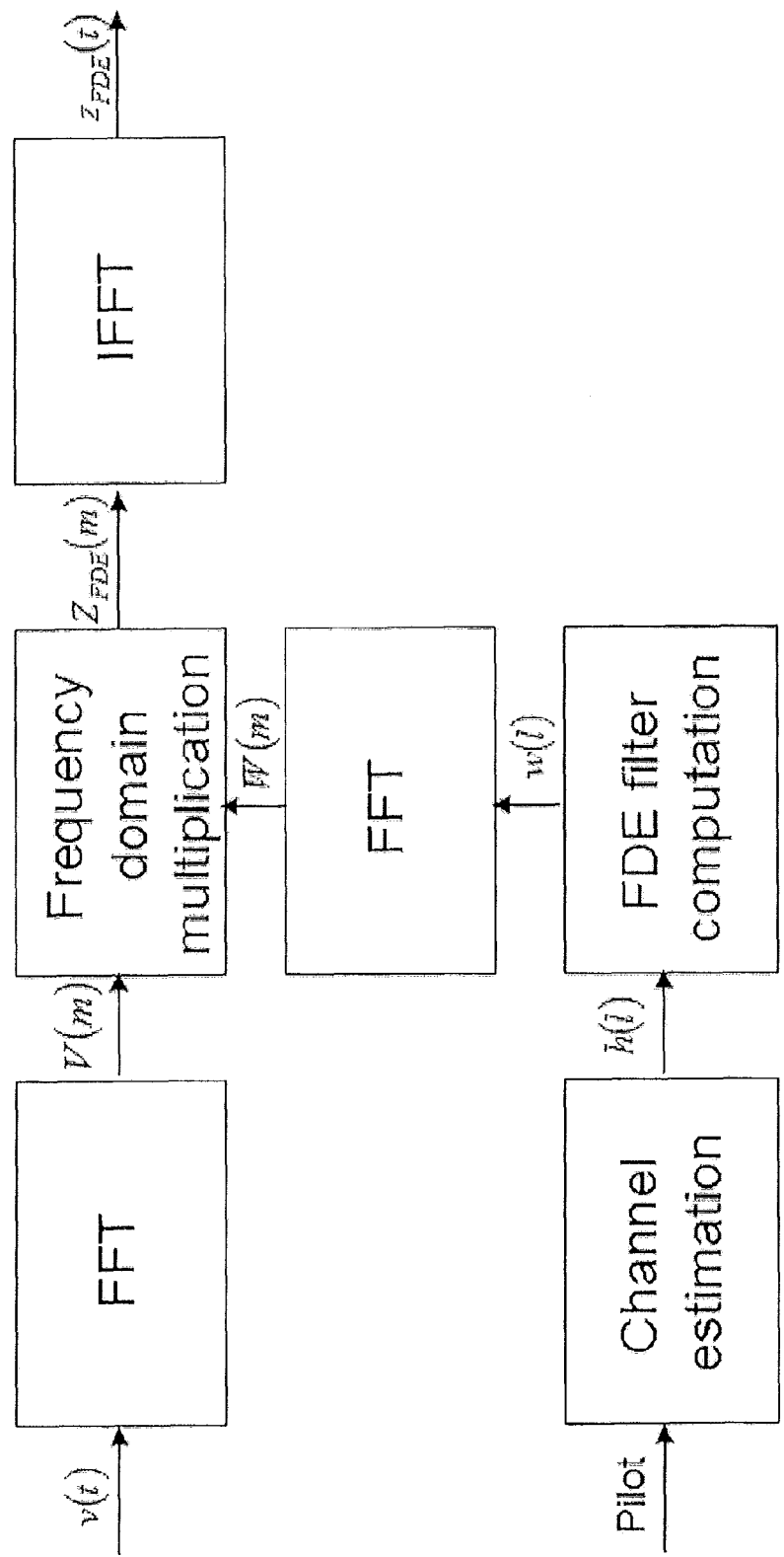
FIG. 3 is a schematic block diagram of an FDE receiver.

A third example of a linear receiver with interference suppression capabilities is the so-called FDE receiver, see [4]. The FDE receiver structure is schematically depicted in FIG. 3. The user index u is omitted in the figure.

The FDE receiver algorithm performs equalization and interference suppression in the frequency domain. To explain this in detail, the following time domain signal model in Equation 9 can be used:

$$v_u(t) = \sum_{l=0}^{L-1} h_u(l)z(t-l) + i(t) + n^{thermal}(t), \quad (9)$$
$$u = 1, \ldots, U.$$

Here u denotes the user, $v_u$ is the received (vector due to multiple antennas) signal, $h_u$ is the radio channel net response, z is the desired (transmitted) signal, i(t) is the interference and $n^{thermal}(t)$ denotes thermal noise, t denotes discrete time.

Taking the Fourier transform, translates Equation 9 into Equation 10 below:

$$V_u(m) = H_u(m)Z_u(m) + I(m) + N^{thermal}(m), u=1,\ldots,U, \quad (10)$$

where the quantities are the discrete Fourier transform of the corresponding quantities in Equation 9.

Subsequently, MMSE equalization can be performed on $V_u(m)$. For this purpose, the channel is estimated using the pilot signal. FIG. 3 then indicates a first basic method to compute the MMSE filter for the FDE, using time domain calculations as described in [4].

However, rather than computing the filter coefficients in the time domain and then transforming to the frequency domain as in FIG. 2, the MMSE filter coefficients can be directly computed as [4], according to Equation 11 below:

$$W_u(m) = H_u^H(m)(H_u(m)H_u^H(m) + I(m)I^H(m) + (N^{thermal}(m))^H N^{thermal}(m))^{-1} \quad (11)$$

u=1, ..., U, where the thermal noise power floor matrix estimate, can be obtained by any of the algorithms of [1], [2] or [3], and where $H_u(m)$ is the sampled channel frequency response vector. The use of Equation (11) is much less computationally complex than the method depicted in FIG. 3 and Equation 11 therefore represents the preferred embodiment for implementation of the FDE receiver.

Finally, the equalized signal is computed by a frequency domain multiplication according to Equation 12 below:

$$Z_{FDE,u}(m) = W_u(m)V_u(m), u=1,\ldots,U, \quad (12)$$

after which the inverse FFT is applied to get the signal $z_{FDE,u}(t)$. After this step processing proceeds as in a conventional WCDMA system.

As mentioned previously, with the deployment of so-called heterogeneous networks (HETNET), several areas need special attention when introducing interference suppression receivers such as the above mentioned G-Rake+, FDPE or FDE. In order to fully understand the difficulties associated with such systems, a detailed description will follow below and with reference to FIG. 4.

Heterogeneous networks concerns effects associated with networks where different kinds of cells are mixed. A problem is then that these cells may have different radio properties in terms of, e.g., radio sensitivity, frequency band, coverage, output power, capacity, and/or acceptable load level.

This can be an effect of the use of different radio base station power classes (macro, micro, pico, femto), different antenna systems (number of antennas, radio remote heads RRHs, etc.), different revision (different receiver technology, SW quality), different vendors and of the purpose of a specific deployment.

One of the most important factors in HETNETs is that of air interface load management, i.e. the issues associated with the scheduling of radio resources in different cells and the interaction between cells in terms of inter-cell interference. The aspects that are of interest for the present disclosure are associated with such air-interface load management in the uplink (UL) of the WCDMA system. The reason for this renewed interest include, amongst other things, the need to optimize performance in HETNETs, and the fact that the concept of load changes with the introduction of the introduction of interference suppression capable receivers e.g. G-rake+.

Figure 4:
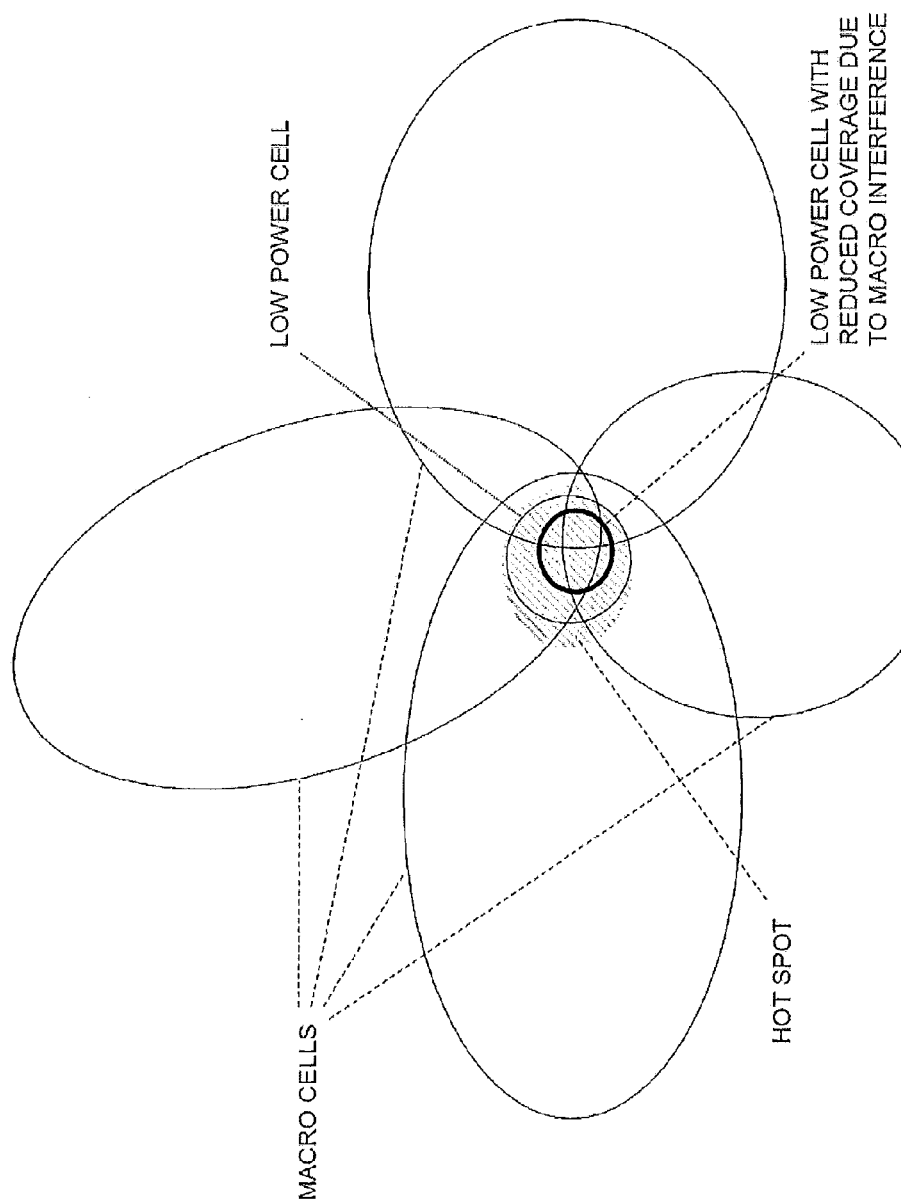
FIG. 4 is an illustration of a HETNET load management problem.

To exemplify these problems, consider again FIG. 4. That figure shows a low power cell with limited coverage intended to serve a hotspot. In order to get a sufficient coverage of the hotspot an interference-suppressing receiver like the G-rake+ is used. The problem is now that the low power cell is located in the interior of and at the boundary of a specific macro cell. Further, surrounding macro cells interfere with the low power cell rendering a high level of neighbor cell interference in the low power cell, that despite the advanced receiver reduces the coverage to levels that do not allow a coverage of the hotspot. As a result, users of the hotspot are connected to the surrounding macro cells, thereby further increasing the neighbor cell interference experienced in the low power cell.

From this discussion, it should be clear that it would be advantageous if the RNC could be informed of the interference situation and take action, using e.g. admission control to reduce neighbor cell interference and to provide a better management of the hotspot traffic—in terms of air interface load.

This requires three pieces of functionality provided in the present disclosure:
- a means to estimate the neighbor cell interference;
- A means to signal the neighbor cell interference from the RBS to the RNC; and
- RNC means for management of the neighbor cell interference experienced by the low power RBS.

The interference of low power RBSs on macro cells constitute a far less significant problem because of the fact that a low power RBS transmits with low power.

Consequently, and as mentioned previously, the inventors have identified a need for providing load measurements that take interference suppression into account and enables signaling of these load measures within a current standard. In addition, the inventors have identified the need for a way to use the provided load measurements in order to improve the load management of IS capable HETNET WCDMA wireless communication systems.

Some of the aspects included in the present disclosure, which aims to counteract and alleviate some of the above mentioned problems are:
- A new Kalman filtering algorithm for high bandwidth estimation of the neighbor cell interference before IS processing.
- Transformation of the neighbor cell interference estimate before IS processing, to a neighbor cell interference estimate after IS processing.
- Utilization of neighbor cell interference estimates in a scheduler for generation of relative grants to the UE, providing "light" interference management for neighbor cells in soft(er) handover with the UE.
- Means for computing the load in terms of i) the rise over thermal after IS processing with the G-rake+, the FDE or the FDPE, and ii) the noise rise relevant for stability after IS processing with the G-rake+, FDE or FDPE, which noise rise is based on the neighbor cell interference, after IS processing.
- Signaling means for indirect signaling of the neighbor cell interference from the RBS to the RNC.
- Interference management means in the RNC, that is responsive to the indirectly signaled neighbor cell interference after IS processing from the RBS, said interference management means e.g. comprising the use of admission control functionality.

Figure 5:
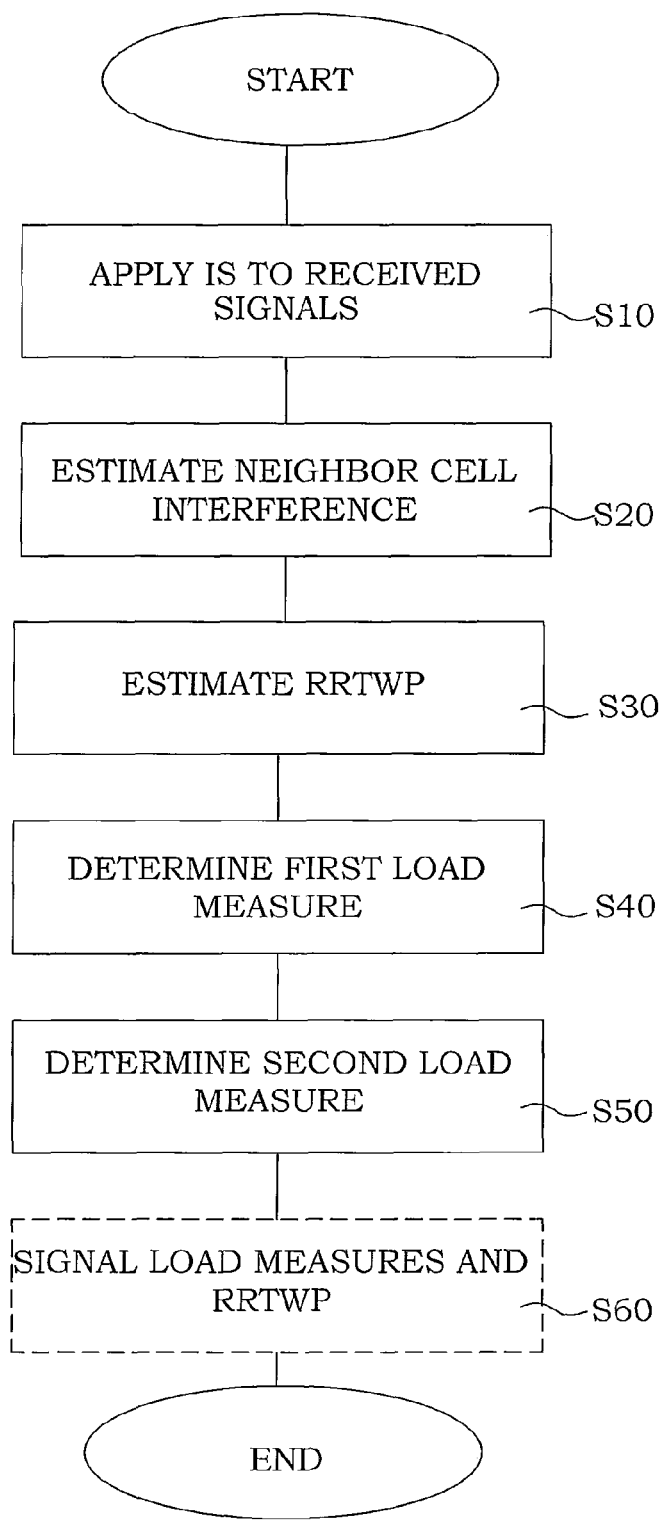
FIG. 5 is a schematic flow diagram of an embodiment of a method in ar radio base station node according to the present disclosure.

With reference to FIG. 5, an embodiment of a method of providing load measurements in an interference suppression capable radio base station node in a heterogeneous WCDMA wireless communication system will be described. The radio base station node is typically associated with a plurality of users in the system, each user causing interference to the other users, which interference is suppressed by the radio base station node. In an initial step, the radio base station node applies S10 interference suppression to received signals to provide interference suppressed received signals. Based on the interference suppressed received signals the radio base station estimates S20 neighbor cell interference. In addition, also based on the interference suppressed received signals the radio base station estimates S30 a reference received total wideband power (RRTWP), i.e. the noise power floor. Subsequently, the radio base station determines S40 a first load measure based on the interference suppressed received signals and the estimated reference received total wideband power, and determines S50 a second load measure also based on the interference suppressed received signals, the estimated reference received total wideband power and additionally on the estimated neighbor cell interference. According to a further embodiment, the radio base station node signals S60 the determined first and second load measures, and the estimated reference received total wideband power to another node e.g. radio network control node, in the wireless communication system.

The determined first and second load measures can, according to particular embodiments, be signaled S60 alternately or jointly.

In order to estimate S20 the neighbor cell interference, a few particular considerations, and steps are performed. The basic idea is to modify the prior art Kalman filter front end of FIG. 1 so that the internally estimated state becomes the sum of neighbor cell interference and thermal noise. This is made possible by introduction of the computed load factor of the own cell which is anyway computed and used for load prediction in the scheduler. The scope is to perform a joint estimation of $P_{RTWP}(t)$, and $P_{neighbor}(t)+P_N(t)$. As it turns out, a time variable Kalman filter is suitable for this task. Here $P_{neighbor}(t)$ denotes the neighbor cell interference power and $P_N(t)$ denotes the thermal noise power floor.

The neighbor cell interference estimation algorithm will use measurements of $P_{RTWP}(t)$, with a sampling rate of $T_{RTWP}=k_{RTWP}TTI$, $k_{RTWP} \in Z+$, and computed load factors $L_{own}(t)$, with a sampling rate of $T_L=k_L TTI$, $k_L \in Z+$.

The state is selected according to Equation 13 below:

$$x_1(t)=P_{neighbor}(t)+P_N(t). \quad (13)$$

The measured signal that is available for processing is $P_{RTWP}(t)$. The load of the own cell $L_{own}(t)$ is a computed quantity (admittedly based on SINR measurements), for this reason a measurement model of $P_{RTWP}(t)$ is needed, expressed in terms of the states, computed quantities and a measurement uncertainty. Towards this end Equation A5 of Appendix A is used together with a delay $T_D$ that models the scheduling loop delay of WCDMA:

$$P_{RTWP}(t)=L_{own}(t-T)P_{RTWP}(t)+P_{neighbor}(t)+P_N(t), \quad (14)$$

which results in Equation 15:

$$P_{RTWP}(t) = \frac{1}{1 - L_{own}(t - T_D)}(P_{neighbor}(t) + P_N(t)). \quad (15)$$

After addition of a zero mean white measurement noise $e_{RTWP}(t)$ and replacement of variables by the state of Equation 13, the following time variable measurement Equation 16 results:

$$y_{RTWP}(t) = \frac{x_1(t)}{1 - L_{own}(t - T_D)} + e_{RTWP}(t). \quad (16)$$

$$R_{2,RTWP}(t)=E[e_{RTWP}^2(t)]. \quad (17)$$

Here $y_{RTWP}(t)=P_{RTWP}(t)$ and $R_{2,RTWP}(t)$ denotes the (scalar) covariance matrix of $e_{RTWP}(t)$.

The load of the own cell is computed using both EUL and R99 traffic, hence in this case the delay is valid for both.

In order to set up an optimal filtering algorithm, it is necessary to write down a model for propagation of the state. Here this is solved by postulating the most simple such model, namely a random walk, according to Equations 18 and 19.

$$x(t+T_{TTI})=x_1(t+T_m)=x_1(t)+w_1(t). \quad (18)$$

$$R_1(t)=E[w_1(t)]^2. \quad (19)$$

Here $R_1(t)$ denotes the covariance matrix of the zero mean white disturbance.

The state space model behind the Kalman filter is defined by Equations 20 and 21 below:

$$x(t+T)=A(t)x(t)+B(t)u(t)+w(t). \quad (20)$$

$$y(t)=C(t)x(t)+e(t). \quad (21)$$

Here $x(t)$ is the state vector, $u(t)$ is an input vector that is not used here, $y(t)$ is an output measurement vector consisting of the power measurements performed in the cell i.e. the received total wideband power, RTWP), $w(t)$ is the so-called systems noise that represent the model error, and $e(t)$ denotes the measurement error. The matrix $A(t)$ is the system matrix describing the dynamic modes, the matrix $B(t)$ is the input gain matrix, while the vector $C(t)$ is the, possibly time varying, measurement vector. Finally t represents the time and T represents the sampling period. The general case with a time varying measurement vector is considered here. The Kalman filter is then given by the following matrix and vector iterations, Initialization $t=t_0$ $\hat{x}(0|-1)=x_0$ $P(0|-1)=P_0$ Iteration $t=t+T$ $K_f(t)=P(t|t-T)C^T(t)(C(t)P(t|t-T)C^T(t)+R_2(t))^{-1}$ $\hat{x}(t|t)=\hat{x}(t|t-T)+K_f(t)(y(t)-C(t)\hat{x}(t|t-T))$ $P(t|t)=P(t|t-T)-K_f(t)C(t)P(t|t-T)$ $\hat{x}(t+T|t)=Ax(t|t)+Bu(t)$ $P(t+T|t)=AP(t|t)A^T+R_1.$ End $\quad (22)$ The quantities introduced by the filter iterations of Equations 22 are as follows. $\hat{x}(t|t-T)$ denotes the state prediction, based on data up to time $t-T$, $\hat{x}(t|t)$ denotes the filter update, based on data up to time $t$, $P(t|t-T)$ denotes the covariance matrix of the state prediction, based on data up to time $t-T$, and $P(t|t)$ denotes the covariance matrix of the filter update, based on data up to time $t$. $C(t)$ denotes the measurement matrix, $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$.

The quantities of the Kalman filter for estimation of the sum of neighbor cell interference and noise power can now be defined. Using the state and measurement equations, it follows in Equation 23 that:

$$C(t) = \frac{1}{1 - L_{own}(t - T_D)}, \quad (23)$$

$$R_2(t)=R_{2,RTWP}(t)=E[e_{RTWP}^2(t)], \quad (24)$$

$$A=1, \quad (25)$$

$$B=0, \quad (26)$$

$$R_1(t)=E[w_1(t)]^2. \quad (27)$$

The final step of the processing, e.g. separating noise floor and neighbor cell interference power, is provided by the prior art algorithms for noise power floor estimation. They operate on the Gaussian distribution of the state $\hat{x}_1(t)$. Denoting the estimated noise floor by $\hat{N}(t)$, it follows that the estimated neighbor cell interference is determined by Equation 28:

$$\hat{I}_{neighbor}(t) \equiv \hat{P}_{neighbor}(t) = \hat{x}(t) - \hat{N}(t). \quad (28)$$

In addition, according to a particular embodiment, the neighbor cell interference of the interference suppressed received signals is estimated based on received signals prior to interference suppression, and transforming the estimate into an estimate of neighbor cell interference after interference suppression.

Figure 6:
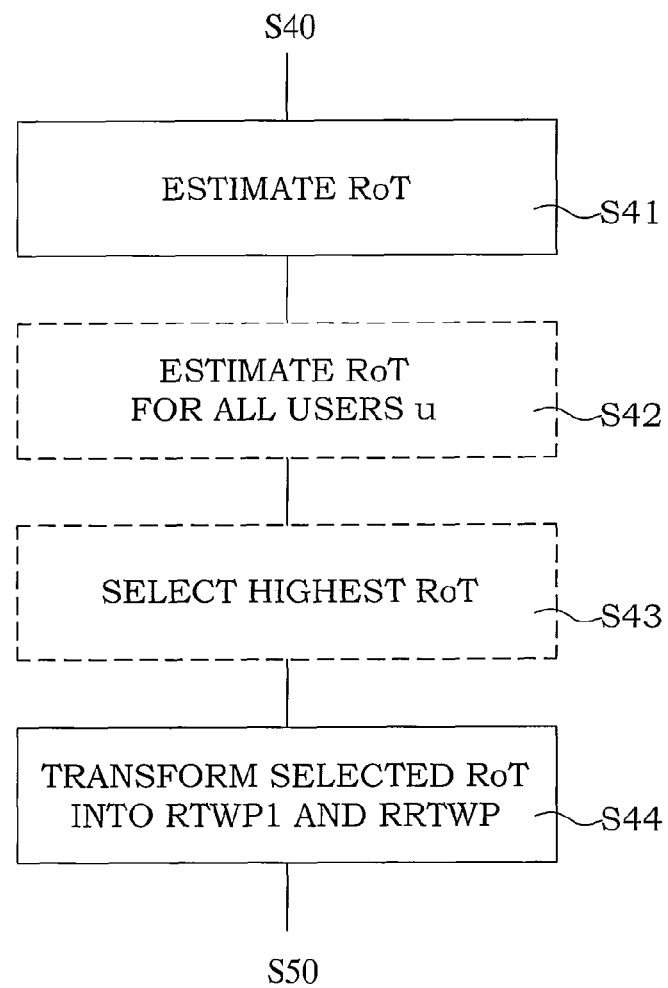
FIG. 6 is a schematic flow diagram illustrating steps for determining the rise over thermal for users.
Figure 7:
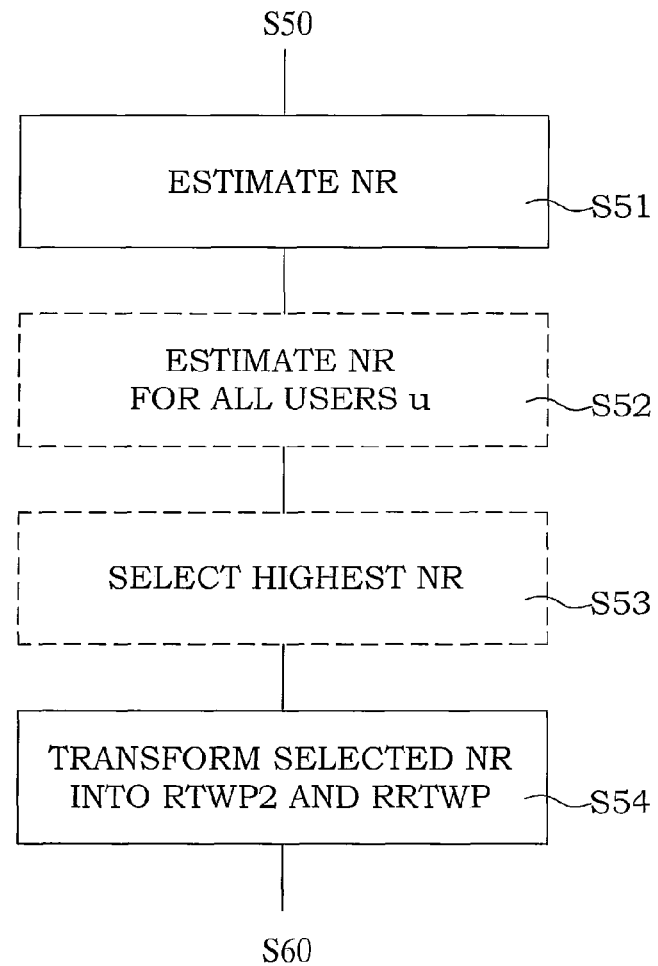
FIG. 7 is a schematic flow diagram illustrating steps for determining the noise rise for users.

With reference to FIG. 6 and FIG. 7, a further embodiment of the method of the present disclosure will be described, where the first and second load measures to be determined are the above mentioned rise over thermal (RoT) and the noise rise (NR). The steps of applying interference suppression S10, estimating neighbor cell interference S20 and estimating the reference received total wideband power are performed as described previously. In addition, the step of determining S40 the first load measure includes the step of estimating S41 a rise over thermal value for the interference suppressed received signals based on the interference suppressed received signals and the estimated reference received total wideband power. Subsequently, and the estimated rise over thermal value is transformed S44 into a first estimate of a received total wideband power (RTWP1), and the estimate of the reference received total wideband power e.g. noise floor. In short, the determined rise over thermal value is split into the RTWP and the noise floor. Further, the method includes the step of determining S50 the second load measure comprises estimating S51 a noise rise value for the interference suppressed received signals based on the interference suppressed received signals, the estimated reference received total wideband power, and the estimated neighbor cell interference. Subsequently, the estimated noise rise value is transformed S54 into a second estimate of a received total wideband power (RTWP2) and the estimated reference received total wideband power e.g. noise floor. In the same manner as for the rise over thermal, the determined noise rise value is split into the RTWP and the estimated reference received total wideband power e.g. noise floor. Finally, the step of signaling S60 the estimated first received total wideband power as the first load measure, and signaling the estimated second received total wideband power as the second load measure, and also signaling the referenced received total wideband power.

The two load measures are based on the measurements during a same time interval, whereby the estimated reference received total wideband power and the estimated neighbor cell interference is valid for both load measures.

According to a specific embodiment, the interference suppression capable receiving node comprises a linear receiver e.g. a FDPE receiver.

A particular example of an embodiment including an FDPE receiver will be described below. The interested reader is guided to Annex D and E for a full derivation of the actual expressions.

In case of an FDPE receiver, the steps of determining the first and second load measures S40 e.g. rise over thermal value, and S50 e.g. noise rise value can be performed jointly for all users at the same time. Consequently, the step of estimating S41 a rise over thermal value RoT for the case of a FDPE receiver is further based on a pre-equalized wideband signal in the time domain, a wideband finite impulse response of the pre-equalizing filter in the time domain, and an estimated thermal noise floor of antenna branch a in the time domain, before pre-equalization. In addition, the step of estimating S51 a noise rise is further based on a pre-equalized wideband signal in the time domain, a wideband finite impulse response of the pre-equalizing filter in the time domain, and an estimated thermal noise floor of antenna branch a in the time domain, before pre-equalization, and on the estimated neighbor cell interference.

According to a further embodiment, the rise over thermal value for the case of a FDPE receiver is determined according to Equation 29 below. For the complete derivation of Equation 29, the interested reader is referred to Annex D where the result for high bandwidth RoT estimation after FDPE processing is obtained.

$$RoT^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)}. \quad (29)$$

The quantities appearing in Equation 29 are explained in Annex D. The processing rate is the slot rate.

Also according to a further embodiment, the noise rise relevant for stability is determined according to Equation 30. For the complete derivation of Equation 36 the interested reader is referred to Annex E where the result for the noise rise relevant for stability after FDPE processing is obtained (using results of Annex D).

$$NF^{FDPE}(t) = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}. \quad (30)$$

The quantities appearing in Equation 30 are explained in Annex D and E.

For the above, the $RoT^{FDPE}$ is the rise over thermal for the uplink after interference suppression, $z_{pre}(t)$ is the pre-equalized wideband signal in the time domain, $w_{pre}(l)$ is the wideband finite impulse response of the pre-equalizing filter in the time domain, and $\hat{N}_a^{thermal}$ is the estimated thermal noise floor of antenna branch a in the time domain, before pre-equalization. In addition, the $\hat{I}_{neighbor}$ is the estimated neighbor cell interference. The processing rate is the slot rate, i.e. the estimated quantities are useful for fast congestion control.

According to the above-described first embodiment of the method, the rise over thermal value and the noise rise value are both estimated for the entire uplink. However, for some receivers, that will be described in more detail later on, the rise over thermal value and the noise rise is estimated per user and the user with the highest rise over thermal value and the user with the highest noise rise value is selected to represent the entire uplink. This further embodiment will be described below with reference to FIG. 6 and FIG. 7.

With reference to FIG. 6 and FIG. 7, a further embodiment of the method of the present disclosure will be described, where the rise over thermal and the noise rise are determined individually for the respective users (as indicated by the dashed boxes in FIG. 6 and FIG. 7) The steps of applying interference suppression S10, estimating neighbor cell interference S20 and estimating the reference received total wideband power are performed as described previously. In addition, the step S41 of estimating a rise over thermal value comprises estimating S42 a respective rise over thermal value for each of the plurality of users, and selecting S43 a highest rise over thermal value of the respective estimated rise over thermal values to represent the rise over thermal value, and determining S40 the first load measure e.g. rise over thermal value based on the selected highest rise over thermal value. In a corresponding manner the noise rise value is estimated S51 by estimating S52 a respective noise rise value for each of the plurality of users, and selecting S53 a highest noise rise value to represent the noise rise, determining S50 the second load measure based on the selected highest noise rise value.

According to another specific embodiment, the interference suppression capable radio base station node includes a linear receiver e.g. a G-Rake+ receiver.

A particular example of an embodiment including a G-Rake+ receiver will be described below. The interested reader is guided to Annex B and Annex C for a full derivation of the actual expressions.

For the example, the rise over thermal RoT value for each respective user u is determined S42 further based on an estimated noise floor for the uplink prior to interference suppression, and SINR for user u after interference suppression. The noise rise value for each respective user u is determined S52 base on, in addition to the same as the rise over thermal value, the estimated neighbor cell interference.

According to a further embodiment, the rise over thermal value for a G-Rake+ receiver is determined S42 for each respective user u according to Equation 31 below. The highest rise over thermal is selected S43 according to Equation 32, and selected highest rise over thermal is selected as the first load measure S40. For the complete derivation of Equation 31 the interested reader is referred to Annex B where the result for high bandwidth RoT estimation after G-Rake+ processing is obtained.

$$RoT_u^{G+} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right), \quad (31)$$

$$u = 1, \ldots, U,$$

$$u_{max} = \underset{u}{\operatorname{argmax}}(RoT_u^{G+}), \quad (32)$$

$$\max(RoT_u^{G+}) = RoT_{u_{max}}^{G+}. \quad (33)$$

The quantities appearing in Equation 31 are all defined in Annex B.

The following result for the noise rise value NR relevant for stability after G-rake+ processing is obtained in Annex C (using results of Annex B) and illustrated by Equation 34 below:

$$NR_u^{G+} = \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{neighbor}}{\hat{N}}, \quad (34)$$

$$u = 1, \ldots, U,$$

$$u_{max} = \underset{u}{\operatorname{argmax}}(NR_u^{G+}), \quad (35)$$

$$\max(NR_u^{G+}) = NR_{u_{max}}^{G+}, \quad (36)$$

As can be seen, the NR experienced by each user is individual as determined S52 by Equation 32. The uplink NR relevant for stability after IS processing is therefore obtained by selection S53 of the worst (highest) NR value experienced by any user according to Equations 35 and 36. The quantities appearing in Equation 34 are all defined in Annex B and C. It is stressed that all estimates are obtained at slot rate, i.e. 1500 Hz.

For Equations 34 and 31 the $RoT_u^{G+}$ is the rise over thermal for user u after interference suppression, $S_{u,}^{G+}$ is the signal power for user u, $\kappa_u^{G+}$ is the scale factor for user u, $\hat{N}$ is the estimated noise floor prior to interference suppression, $SF_{u,DPCCH}$ is the spreading factor of the DPCCH channel for user u, $\beta_{u,effective}^2$ is the total effective beta factor squared (data power offset) for user u, $SINR_u^{G+}$ is the SINR for user u after interference suppression. In addition, the $\hat{I}_{neighbor}$ is the estimated neighbor cell interference.

According to a specific embodiment, the interference suppression capable receiving node comprises a linear receiver, e.g., a FDE receiver.

A particular example of an embodiment including an FDE receiver will be described below. The interested reader is guided to Annex F and Annex G for a full derivation of the actual expressions.

A further example of an embodiment where a rise over thermal and a noise rise for each of the plurality of users is estimated individually is the already mentioned FDE receiver. In this case, the step of estimating S42 a respective rise over thermal RoT for each of the plurality of users is further based on the pre-equalized wideband signal for user u in the time domain, a wideband finite impulse response of the equalizing filter in the time domain for user u, and an estimated thermal noise floor of antenna branch a in the time domain, before equalization. This is further illustrated by Equation 37 below:

$$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)}, \quad (37)$$

$$u = 1, \ldots, U,$$

$$RoT^{FDE} = \max_u RoT_u^{FDE}, \quad (38)$$

where $RoT_u^{FDE}$ is the rise over thermal for user u after interference suppression, $z_{FDE,u}(t)$ is the pre-equalized wideband signal for user u in the time domain, $w_u(l)$ is the wideband finite impulse response of the equalizing filter in the time domain for user u, and $\hat{N}_a^{thermal}$ is the estimated thermal noise floor of antenna branch a in the time domain, before pre-equalization.

The quantities appearing in Equation 37 are explained in Annex F. The processing rate is the slot rate.

In addition, the step of estimating S52 a respective noise rise value for each of the plurality of users is further based on pre-equalized wideband signal for user u in the time domain, a wideband finite impulse response of the equalizing filter in the time domain for user u, and an estimated thermal noise floor of antenna branch a in the time domain, before equalization, and on the estimated neighbor cell interference.

The following result for the noise rise relevant for stability after FDE processing is obtained in Annex G (using results of Annex F) and illustrated by Equation 39 below $$NR_u^{FDE}(t) = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}, \quad (39)$$

$$NR^{FDE}(t) = \max_u NR_u^{FDE}(t), \quad (40)$$

where $\hat{I}_{neighbor}$ is the estimated neighbor cell interference.

The quantities appearing in Equations 37 and 39 are explained in Annex F and G. The processing rate is the slot rate.

As mentioned previously, the current so-called Iub interface only allows signaling of the noise power floor (denoted Reference Received Total Wideband Power) and the received total wideband power (RTWP). The reference point for these measurements are at the antenna connector, i.e. before any IS processing.

There is hence:
No reporting after IS processing from the RBS to the RNC defined in 3GPP.
No reporting of neighbor cell interference from the RBS to the RNC defined in 3GPP The present disclosure therefore proposes the use of the signaling of the RTPW, for joint proprietary signaling of:
The load relevant for coverage (the rise over thermal, RoT), after IS processing.
The load relevant for stability (RoT minus the noise rise contribution from the neighbor cell interference), after IS processing.
The neighbor cell interference, after IS processing.

These measures and the estimation and determination thereof have been described above with reference to the various embodiments of the present disclosure. In summary the joint proprietary signaling of neighbor cell interference, RoT and noise rise relevant for stability over Iub is performed according to the present disclosure by signaling the $RoT^{IS}$ in every second reporting interval and $NR^{IS}$ in every other second interval. Here $RoT^{IS}$ is any one of Equation 29, 31 or 37, and $NR^{IS}$ is any one of Equations 30, 34 or 40, counted pair wise so that receiver types are not mixed up. It is assumed that $RoT^{IS}$ and $NR^{IS}$ are based on measurements from the same time (slot). Although described as signaling the two load measures every second interval, it is quite possible to perform the signaling with some other separation in time as long as both the radio base station and the radio network control node are aware of the intervals used.

Consequently, according to a particular embodiment for the present disclosure, for the rise over thermal signaling: The noise power floor $\hat{N}$ estimated before IS processing is signalled as the Reference Received Total Wideband Power. This can be a combination over antenna branches as indicated for FDE and FDPE. Subsequently, the $\hat{N} \cdot RoT^{IS}$ is computed and signaled as the Received Total Wideband Power.

In a corresponding manner for the noise rise the noise power floor $\hat{N}$ estimated before IS processing is signalled as the Reference Received Total Wideband Power. This can be a combination over antenna branches as indicated for FDE and FDPE. Subsequently, the $\hat{N} \cdot NR^{IS}$ is computed and signaled as the Received Total Wideband Power.

As mentioned previously, a radio network control node needs to be able to identify the signaled first and second load measures and use them to properly manage the load e.g. control admission in the radio base station node. Consequently, according to an embodiment of a method of performing load management will be described with reference to FIG.

8. Initially, the radio network control node receives S80 a first load measure, a second load measure, and an estimated reference received total wideband power from a radio base station node in the system. Based on the received two load measures and the estimated reference received total wideband power the radio network control node reconstructs S90 neighbor cell interference in the radio base station node based on the first and second load measures and the estimated reference received total wideband power. Finally, the radio network control node performs load management S100 for the radio base station node based on at least one of the reconstructed neighbor cell interference level and the at least first and second load measure.

According to a particular embodiment, the reconstructing step S90 is based on the difference between the first and said second load measures, and on the estimated reference received total wideband power. In particular, the load measures are based on a rise over thermal value and a noise rise value. After reception of the above information at two consecutive reporting intervals $\hat{N}, RoT^{IS}$ and $NR^{IS}$ are available in the RNC. The RNC can then compute the quantity according to Equation 41 below $$\hat{N}(RoT^{IS} - NR^{IS}) = \hat{N}\frac{\hat{I}_{neighbor}}{\hat{N}} = \hat{I}_{neighbor} \quad (41)$$

where $RoT^{IS}$ is said first load measure, and $NR^{IS}$ is said second load measure, and $\hat{N}$ is the estimated reference received total wideband power, and $\hat{I}_{neighbor}$ is the estimated neighbor cell interference.

The neighbor cell interference level of the cell in question has been made available to the RNC. On top of that the RNC has perfect knowledge of the level of load in the cell, as stated by $RoT^{IS}$ and $NR^{IS}$.

The step of managing load can comprise admission control, which is described more in detail below, or balancing the load.

Figure 8:
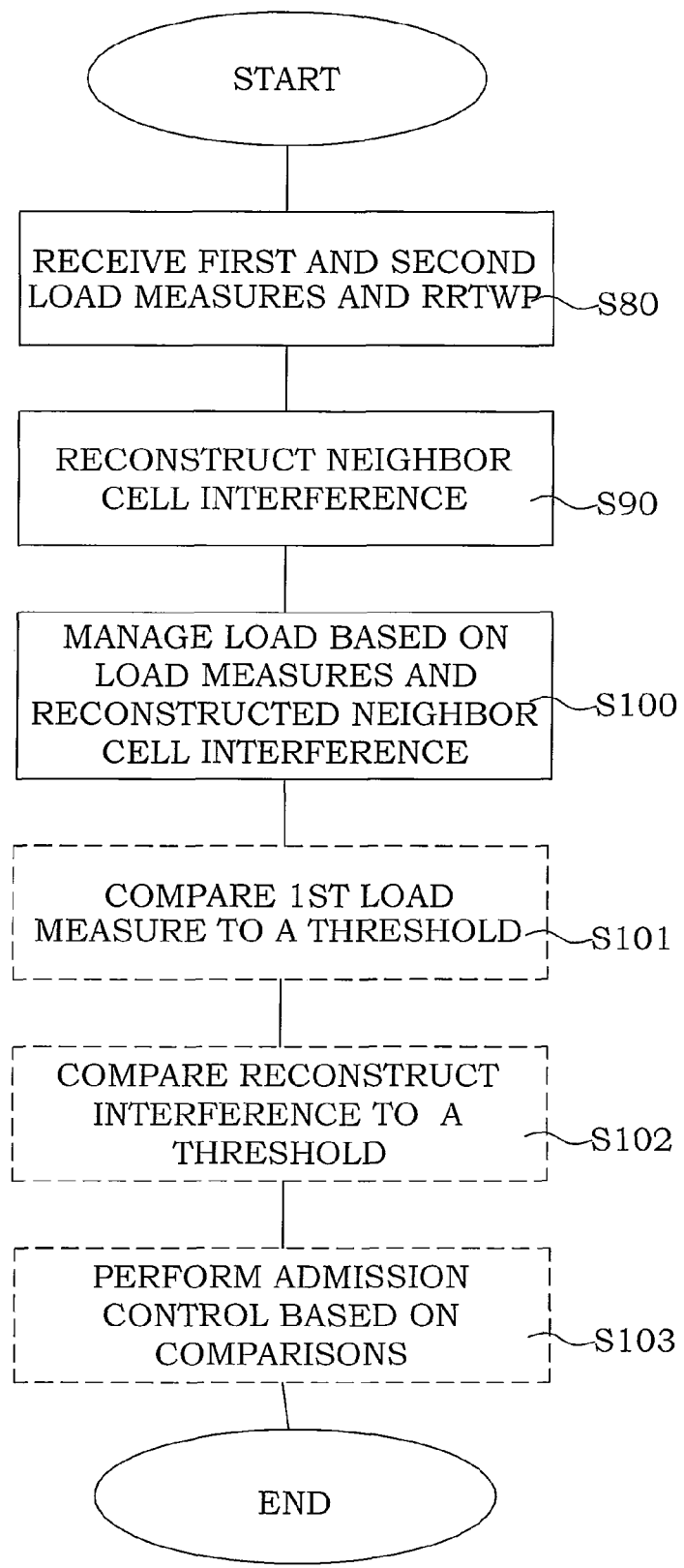
FIG. 8 is a schematic flow diagram of an embodiment of a method in a radio network controller node according to the present disclosure.
Figure 9:
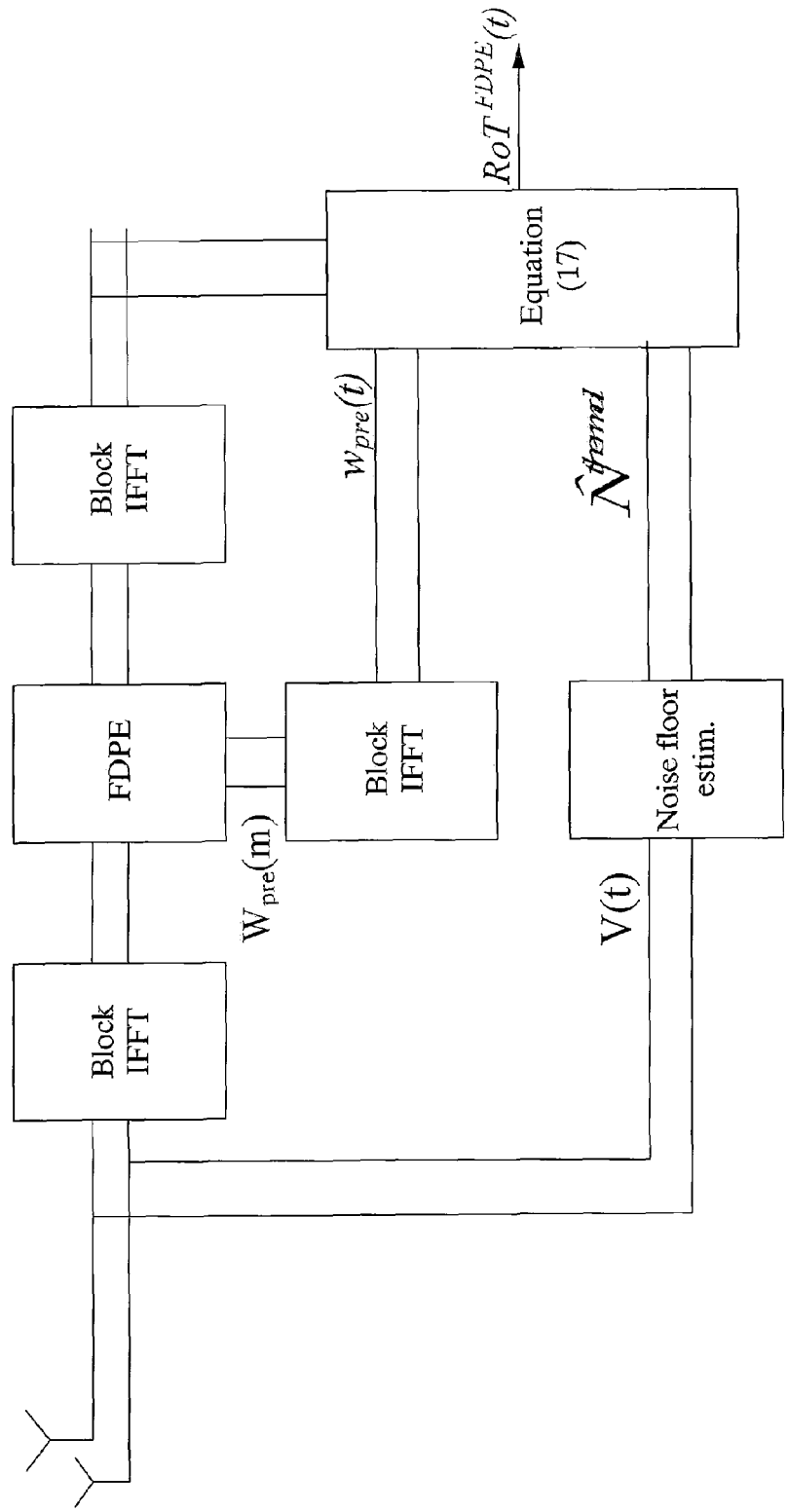
FIG. 9 is a schematic block diagram of an embodiment with an FDPE receiver of the present disclosure.

The best existing alternative for the RNC is to apply load-based admission control for interference management. According to yet a further embodiment, with reference to the dashed boxes of FIG. 8, admission control S100 is performed by comparing S101 the rise over thermal value RoT with a predetermined threshold, and comparing S102 the neighbor cell interference with another predetermined threshold if the RoT supersedes its predetermined threshold. Finally, admission control thresholds are adjusted S103 for surrounding cells or of own cell based on the comparisons.

This can be done in many ways of which only an example is given here. The key idea would be to counter the problem in FIG. 4 by executing algorithms of the following kind Check S101 if $RoT^{IS}$ is too high, indicating a loss of coverage. If not, do nothing, otherwise proceed with step 2.

Check S102 if $\hat{I}_{neighbor}$ is also too high. If not proceed with step 2a, otherwise proceed with step 2b.

2a) The neighbor cell interference is too high. Use an algorithm to reduce the admission control thresholds of the surrounding cells—it is not immediately known which cell that is causing the problem.

2b) The own cell interference is too high. Use an algorithm to reduce the admission control threshold of the own cell.

End

Figure 10:
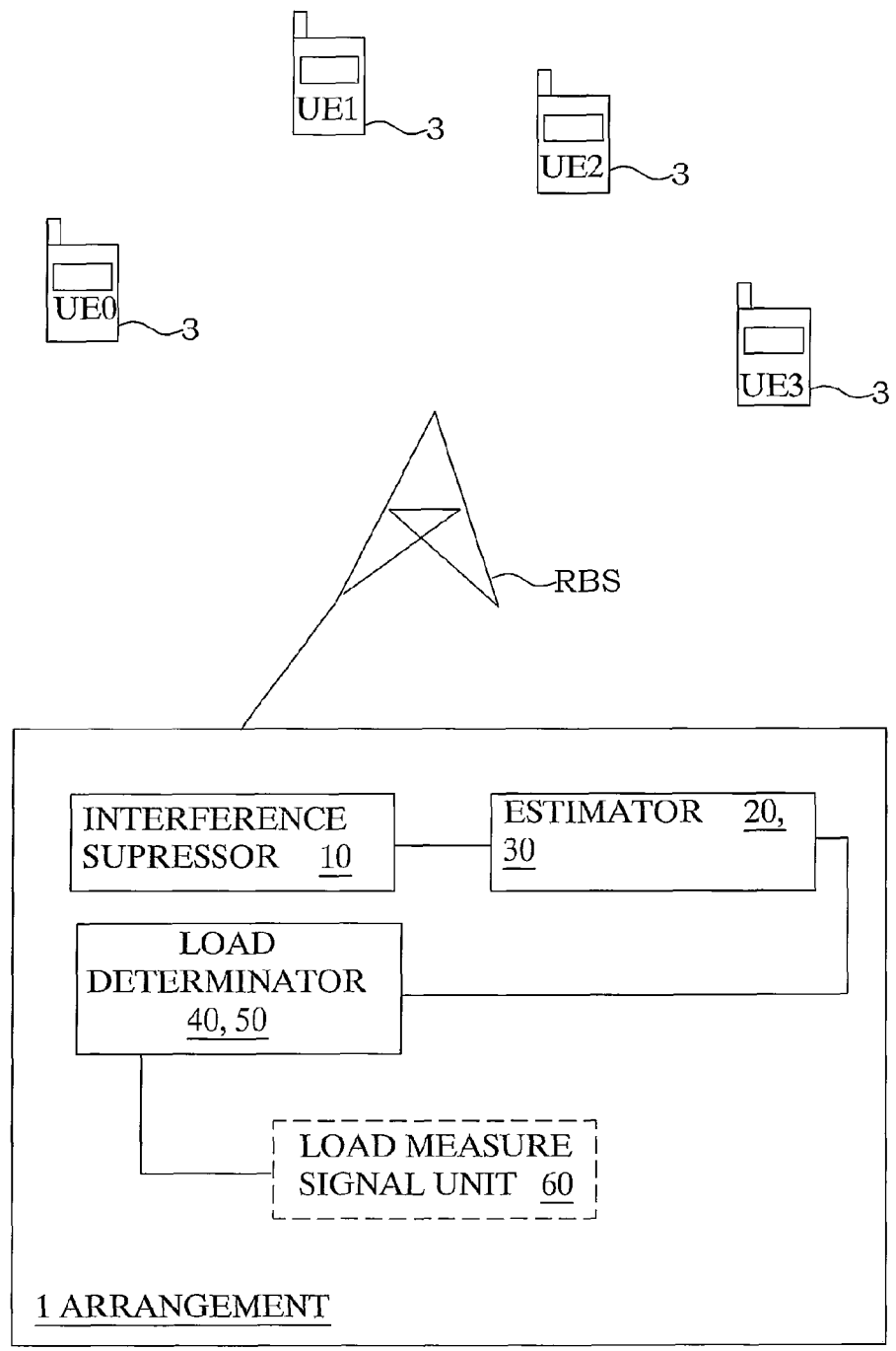
FIG. 10 is a schematic block diagram of an embodiment of an arrangement in a radio base station node according to the present disclosure.

With reference to FIG. 10, an embodiment of arrangement 1 for providing load measurements in a radio base station node RBS associated with a plurality of users 3 in a heterogeneous wireless communication system will be described. The arrangement 1 includes an interference suppression unit 10 configured to apply interference suppression to received signals in the radio base station node RBS, to provide interference suppressed received signals. Further, the arrangement 1 includes a neighbor cell interference estimator unit 20 configured for estimating neighbor cell interference based on the interference suppressed received signals, and a reference received total wideband power estimator unit 30 configured for estimating a reference received total wideband power, based on the interference suppressed received signals. In this Figure the two estimator units 20, 30 are illustrated as implemented in one estimator box 20, 30, but they could equally be implemented as two separate physical units. In addition, the arrangement 1 includes a first load measure determining unit 40 configured for determining a first load measure based on the interference suppressed received signals and the estimated reference received total wideband power, and a second load measure determining unit 50 configured for determining a second load measure based on the interference suppressed received signals, the estimated reference received total wideband power, and the estimated neighbor cell interference. In this embodiment the two load determining units 40, 50 are illustrated as one estimator box 40, 50. However, they may equally be implemented as two separate physical units. According to a further embodiment, the arrangement 1 includes a signaling unit 60 configured for signaling the first and said second load measure and the estimated reference received total wideband power to another node in the wireless communication system.

According to a particular embodiment the said first load determining unit 40 is configured for determining the first load measure by estimating a rise over thermal value for the interference suppressed received signals based on the interference suppressed received signals and the estimated reference received total wideband power and transforming the rise over thermal estimate into a first estimate of a received total wideband power, and the estimate of the reference received total wideband power. Further, the second load determining unit 50 is configured for determining said second load measure by estimating a noise rise value for the interference suppressed received signals based on the interference suppressed received signals, the estimated reference received total wideband power, and the estimated neighbor cell interference, and transforming the noise rise estimate into a second estimate of a received total wideband power. Finally, the signaling unit 60 is configured for signaling the estimated first received total wideband power as the first load measure, and signaling the estimated second received total wideband power as said second load measure, and signaling the estimated reference received power.

The above described arrangement is configured to determine the rise over thermal and the noise rise values for all users combined. This is particularly suitable for linear receivers such as the so called FDPE receiver. However, for some other linear receivers, namely G-Rake+ and FDE receivers a subtly different approach is required. In this case it is necessary to estimate the rise over thermal and the noise rise for each user and selecting a highest (worst case) value for each to represent all users. This requires a further embodiment of the arrangement 1, described below.

According to a particular embodiment the first determining unit 40 is further configured for estimating a rise over thermal value by estimating a respective rise over thermal value for each of the plurality of users and selecting a highest rise over thermal value of the respective estimated rise over thermal values to represent the rise over thermal value, and to determine the first load measure based on the selected rise over thermal value, and the second determining unit 50 is further configured for estimating a noise rise by estimating a respective noise rise for each of the plurality of users, and to select a highest noise rise to represent the noise rise, and to determine the second load measure is based on the selected noise rise.

The above mentioned embodiments of an arrangement 1 in a radio base station node are configured to enable the functionality of the previously described embodiments of methods.

Figure 11:
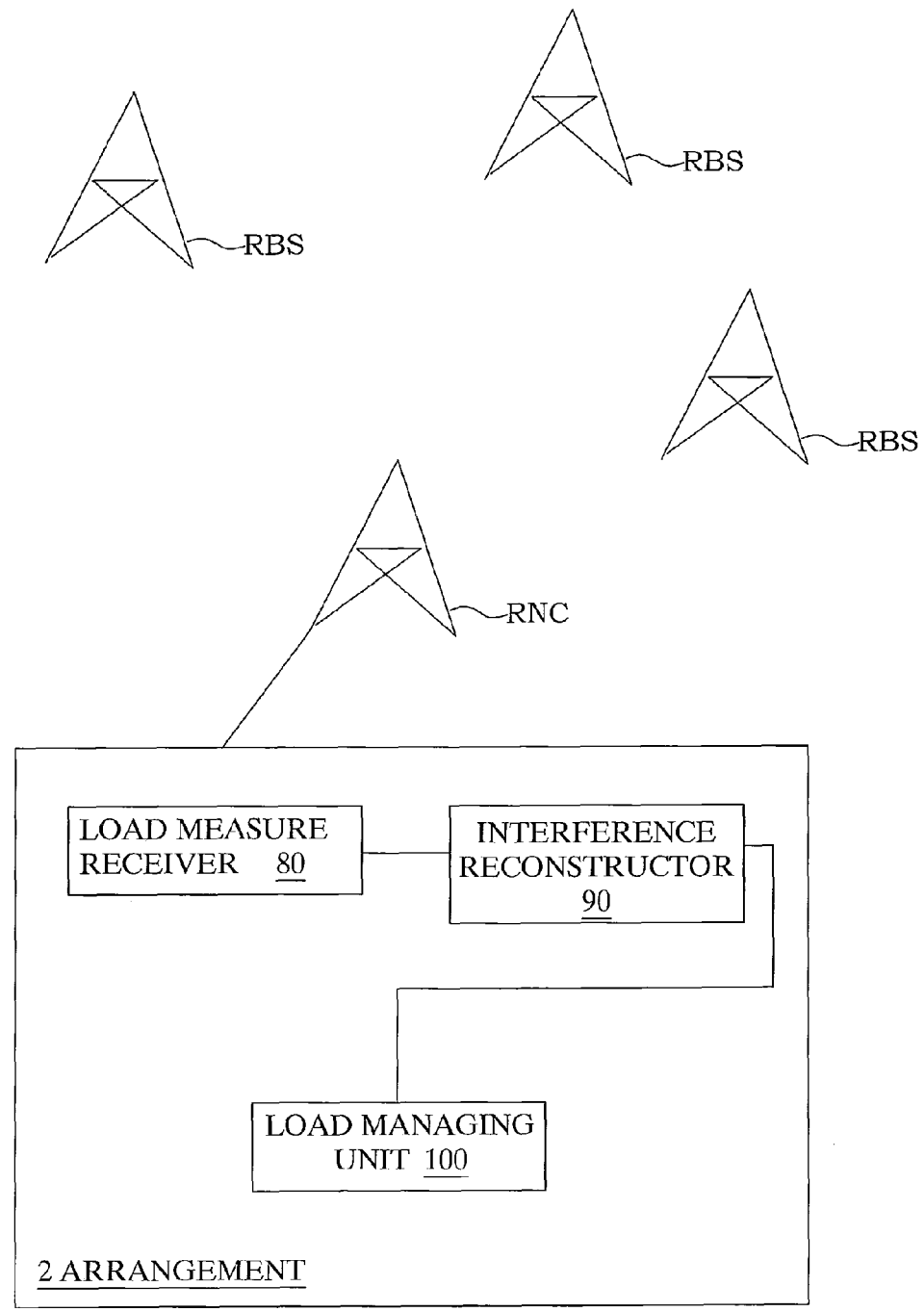
FIG. 11 is a schematic block diagram of an embodiment of an arrangement in a radio network control node according to the present disclosure.

In order to provide the load management functionality in a radio network control node, an embodiment of an arrangement 2 in a radio network control node RNC in a heterogeneous wireless communication system will be described with reference to FIG. 11. The system typically includes a plurality of interference suppression capable radio base stations RBS associated with the radio network control node RNC. The arrangement 2 includes a receiving unit 80 configured for receiving a first load measure and a second load measure and an estimated reference received total wideband power from at least one radio base station node in the system. In addition the arrangement 2 includes an interference reconstructing unit 90 configured for reconstructing neighbor cell interference in the at least one radio base station node based on the first and second load measures and on the estimated reference received total wideband power. Finally, the arrangement 2 includes an load management unit 100 configured for performing load management in the at least one radio base station node based on at least the reconstructed neighbor cell interference level and the at least first and second load measure.

The above described arrangement 2 for load management in a radio network control node is configured to provide the functionality as described with reference to the embodiments of load management methods of the present disclosure.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

In the following, an example of a computer-implementation will be described with reference to FIG. 12. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

One advantage of the present disclosure is that it enables load in terms of both the rise over thermal and the noise rise relevant for stability to be measured after IS processing in a radio base station node, and further signaled to the radio network control node. The RNC can then reconstruct the neighbor cell interference level and use that together with the load measures to perform HETNET load management e.g. admission control by the use of novel admission control algorithms.

REFERENCES

[1] T. Wigren and P. Hellqvist, "Estimation of uplink WCDMA load in a single RBS", *Proc. IEEE VTC*-2007 *Fall*, Baltimore, Md., USA, Oct. 1-3, 2007.
[2] T. Wigren, "Soft uplink load estimation in WCDMA", *IEEE Trans Veh. Tech.*, March, 2009.
[3] T. Wigren, "Recursive noise floor estimation in WCDMA", *IEEE Trans. Veh. Tech.*, vol. 59, no. 5, pp. 2615-2620, 2010.
[4] E. Dahlman, S. Parkvall, J. Sköld and P. Beming,"3G Evolution—HSPA and LTE for mobile broadband—section 5.1" 2:nd edition, Academic Press, 2008.
[5] *Requirements for Support of Radio Resource Management (FDD)*, June 2005. 3GPP TS 25.133, release 6 (v. 6.10.0). [Online]. Available: http://www.3gpp.org/ftp/Specs/html-info/25133.htm
[6] T. Wigren and A. Persson, "Grake+ indirect uplink load estimation", Patent Application PCT/SE2009/051003.

ANNEX A

Load and ROT Estimation without IC/IS

Load without IC/IS

It is e.g. shown in prior art that without IC/IS, the load at the antenna connector is given by the noise rise, or rise over thermal, RoT(t), defined by Equation A1

$$RoT(t) = \frac{RTWP(t)}{N(t)} \quad (A1)$$

where N(t) is the thermal noise level as measured at the antenna connector. It remains to define what is meant with RTWP(t). This relative measure is unaffected of any de-spreading applied. The definition used here is simply the total wideband power according to Equation A2

$$RTWP(t) = \sum_{k=1}^{K} P_k(t) + I^N(t) + N(t) \quad (A2)$$

also measured at the antenna connector. Here, $I^N(t)$ denotes the power as received from neighbor cells N of the WCDMA system, and $P_k(t)$ is the received power from the transmission at time t from user k in the own cell. As will be seen below, the major difficulty of any RoT estimation algorithm is to separate the thermal noise power from the interference from neighbor cells.

Another specific problem that needs to be addressed is that the signal reference points are, by definition, at the antenna connectors. The measurements are, however, obtained after the analogue signal conditioning chain, in the digital receiver. The analogue signal conditioning chain does introduce a scale factor error of about 1 dB (1-sigma) that is difficult to compensate for. Fortunately, all powers of (2) are equally affected by the scale factor error so when (1) is calculated, the scale factor error is cancelled as $$RoT^{Digital\ Receiver}(t) = \frac{RTWP^{Digital\ Receiver}(t)}{N^{Digital\ Receiver}(t)} = \frac{\gamma(t)RTWP^{Antenna}(t)}{\gamma(t)N^{Antenna}(t)} = RoT^{Antenna}(t) \quad (A3)$$

In order to understand the fundamental problem of neighbor cell interference when performing load estimation, note that $$I^N(t)+N(t)+E[I^N(t)]+E[N(t)]+\Delta I^N(t)+\Delta N(t) \quad (A4)$$

where $E[\ ]$ denotes mathematical expectation and where $\Delta$ denotes the variation around the mean. The fundamental problem can now be clearly seen. Since there are no measurements available in the RBS that are related to the neighbor cell interference, a linear filtering operation can at best estimate the sum $E[I^N(t)]+E[N(t)]$, cf. [1]. This estimate cannot be used to deduce the value of $E[N(t)]$. The situation is the same as when the sum of two numbers is available. Then there is no way to figure out the values of the individual numbers. This issue is analyzed rigorously for the RoT estimation problem in [2] where it is proved that the noise power floor is not mathematically observable.

RoT Estimation Algorithms in Prior Art
Sliding Window Algorithm

The RoT estimation algorithm currently in use is depicted in FIG. 1. It is described in detail in [1]. The algorithm estimates the RoT, as given by (1). The main problem solved by the estimation algorithm is the accurate estimation of the thermal noise floor $N(t)$. Since it is not possible to obtain exact estimates of this quantity due to the neighbor cell interference, the estimator therefore applies an approximation, by consideration of the soft minimum as computed over a relative long window in time.

It is important to understand that this estimation relies on the fact that the noise floor is constant over very long periods of time (disregarding the small temperature drift).

Recursive Algorithm

The sliding window algorithm of the above section has the disadvantage of requiring a large amount of storage memory. This becomes particularly troublesome in case a large number of instances of the algorithm is needed, as may be the case when IS is introduced in the uplink.

To reduce the memory consumption a recursive algorithm has been disclosed in a new publicly available patent application. That algorithm [3] reduces the memory requirements of the sliding window scheme discussed above at least by a factor of 100.

The invention disclosed here is applicable both to the sliding window RoT estimation algorithm and the recursive algorithm.

Cell Stability Oriented Load Estimation Algorithms in Prior Art

The prior art cell stability load estimation functionality, e.g. available in the Ericsson product, exploits load factors for each user. In their simplest form the load factors are given by $$L_u = \frac{P_u}{RTWP} = \frac{(C/I)_u}{1+(C/I)_u}, \quad (A5)$$
$$u = 1, \ldots, U$$

where $P_u$ is the received power of user u. Load factors are then summed up for all power controlled users. In this way the neighbor cell interference is not included in the resulting load measure. This is reasonable since the neighbor cell interference should not affect the own cell power control loop stability, at least not when first order effects are considered.

ANNEX B

G-Rake+ RoT

Measurement of Load after IS in G-Rake+ and Chip Equalizers

To see how load can be estimated taking account of the G-rake+ IS gain, the powers after weight combining are studied at sufficient statistics level. First, it is assumed that the received signal of user u on code $k \in \Omega_u$ is $$y_{u,k}=h_u s_{u,k}+I_{u,k}+N_{u,k}, u=1,\ldots,U,k=1,\ldots,K \quad (B1)$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. G-rake+ then performs weight combining to get the sufficient statistics $z_{u,k}^{G+}$ according to the equations $$\hat{z}_{u,k}^{G+}=\hat{w}_u^H y_{u,k}=\hat{w}_u^H \hat{h}_u s_{u,k}+\hat{w}_u^H I_{u,k}+\hat{w}_u^H N_{u,k},$$
$$u=1,\ldots,U,k=1,\ldots,K \quad (B2)$$

$$\hat{R}_u \hat{w}_u = \hat{h}_u, u=1,\ldots,U \quad (B3)$$

Here $\hat{w}_u$ are the combining weights of G-rake+, whereas the estimated covariance matrix that models the interference for computation of the combining weights for the users u is given by $\hat{R}_u$. Equations (B2) and (B3) have two main implications; one indicating how power measurements can be done and one indicating the scale factor problem which is addressed below.

Using equation (B2) it can be seen that the effect of the G-rake+ weight combining is the same as if an artificial received signal $z_{u,k}^{G+}$ would be processed. Since these signals obviously reflect the weight combining and thereby the IS gains of the G-rake+ receiver, $z_{u,k}^{G+}$, u=1, ..., U, k=1, ..., K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, ..., U, k=1, ..., K, in order to reuse the load concept applied without IS.

It is not clear if the proposed approach to reuse the load concept applied without IS is precise or optimal. At the present time it is the only approach available. A further study using first principles from information theory is recommended in the longer time frame.

User Powers Associated with the G-Rake+ Sufficient Statistics

Squaring (B2) and assuming a low degree of correlation between its three terms, leads to $$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u \equiv \quad (B4)$$
$$S_{u,k}^{G+} + I_{u,k}^{G+} + N_{u,k}^{G+},$$
$$u = 1, \ldots, U, k = 1, \ldots, K.$$

The rise over thermal, as seen by user u is now (A1 of Appendix A), by definition $$RoT_u^{G+} \equiv \frac{S_u^{G+} + I_u^{G+} + N_u^{G+}}{N_u^{G+}} \quad (B5)$$

$$S_u^{G+} = \sum_{k \in \Omega_u} S_{u,k}^{G+} \quad (B6)$$

$$I_u^{G+} = \sum_k I_{u,k}^{G+} \quad (B7)$$

$$N_u^{G+} = \sum_k N_{u,k}^{G+} \quad (B8)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (A4) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (B4)-(B8).

Computation of $S_u^{G+}$

The signal power is computed directly from (B6). Using (B4) and (B6) then results in $$S_u^{G+} = \sum_{k \in \Omega_u} S_{u,k}^{G+} = \quad (B9)$$
$$\hat{w}_u^H \hat{h}_u \hat{h}_u^H \hat{w}_u \sum_{k \in \Omega_u} |s_{u,k}|^2 = \hat{w}_u^H \hat{h}_u \hat{h}_u^H \hat{w}_u \hat{E}_{s,u} = |\hat{w}_u^H \hat{h}_u|^2 \hat{E}_{s,u},$$
$$u = 1, \ldots, U$$

Note that computation of the signal energy $\hat{E}_{s,u}$ is quite intricate, including e.g. the involved beta factors.

Computation of $N_u^{G+}$

White Noise Power Floor

The idea here is to rely on the baseline thermal noise power floor estimation algorithm to estimate the thermal noise power floor before any G-rake+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the scale factor by which the thermal noise power is scaled. To compute this quantity, first note that when the wideband thermal noise power floor is estimated before G-rake+ processing, e.g. with the baseline noise floor estimator, the following quantity is estimated $$\hat{N} = \frac{1}{M} \sum_{m=1}^{M} \sum_{k=1}^{K} (N_{u,k}^m)^H N_{u,k}^m \xrightarrow[M \to \infty]{} KE[(N_{u,k})^H N_{u,k}] = \quad (B10)$$
$$KP_{Nu,k} = K \frac{1}{K} P_N = N_0$$

where $N_0$ is the thermal noise power floor and where m is the sample summation index. The power at the sufficient statistics signal processing point is however $$\hat{N}^{G+} = \quad (B11)$$
$$\frac{1}{M} \sum_{m=1}^{M} \sum_{k=1}^{K} (\hat{w}_u^H N_{u,k}^m)^H \hat{w}_u^H N_{u,k}^m = \frac{1}{M} \sum_{m=1}^{M} \sum_{k=1}^{k} tr((\hat{w}_u^H N_{u,k}^m)^H \hat{w}_n^H N_{u,k}^m) =$$
$$\frac{1}{M} \sum_{m=1}^{M} \sum_{k=1}^{K} tr(\hat{w}_n^H N_{u,k}^m (\hat{w}_u^H N_{u,k}^m)^H) =$$
$$\frac{1}{M} \sum_{m=1}^{M} \sum_{k=1}^{K} tr(\hat{w}_u^H N_{u,k}^m (N_{u,k}^m)^H \hat{w}_u) =$$
$$tr\left(\sum_{k=1}^{K} \hat{w}_u^H \left(\frac{1}{M} \sum_{m=1}^{M} N_{u,k}^m (N_{u,k}^m)^H\right) \hat{w}_u\right)_{M \to \infty}$$
$$tr(K \hat{w}_u^H E[N_{u,k}(N_{u,k})^H] \hat{w}_u) =$$
$$tr(K \hat{w}_u^H (N_0/K) I \hat{w}_u) = \hat{w}_u^H \hat{w}_u N_0 = \hat{w}_u^H \hat{w}_u \hat{N}.$$

The conclusion is that the thermal noise floor at the sufficient statistics signal point can be obtained from the noise floor estimate before G-rake+ processing, by a multiplication with the scale factor $$\kappa_u^{G+} = (\hat{w}_u)^H \hat{w}_u, u = 1, \ldots, U \quad (B12)$$

This gives $$N_u^{G+} = \kappa_u^{G+} \hat{N}, u = 1, \ldots, U \quad (B13)$$

The computation of the scale factor requires an additional inner product for each user.

Colored Noise Power Floor

This subsection discusses the case where the result of (B10) is replaced by the more general assumption $$\frac{1}{M} \sum_{m=1}^{M} \sum_{k=1}^{K} N_{u,k}^m (N_{u,k}^m)^H \xrightarrow[M \to \infty]{} KE[N_{u,k}(N_{u,k})^H] = K \frac{N_0}{K} R_N = N_0 R_N \quad (B14)$$

i.e. the case when sampling is fast enough to reflect the shape of the uplink spectrum. In this case it follows that (B10) is transformed to $$\hat{N} = \frac{1}{M} \sum_{m=1}^{M} \sum_{k=1}^{K} (N_{u,k}^m)^H N_{u,k}^m \xrightarrow[M \to \infty]{} KE[(N_{u,k})^H N_{u,k}] = \quad (B15)$$
$$Ktr(E[N_{u,k}(N_{u,k})^H]) = N_0 tr(R_n)$$

Furthermore, (B11) is transformed into $$\hat{N}^{G+} = N_0 tr(\hat{w}_u^H R_N \hat{w}_u) \quad (B16)$$

The end result in this case is the scale factor $$\kappa_u^{G+} = \frac{tr(\hat{w}_u^H R_N \hat{w}_u)}{tr(R_N)} \quad (B17)$$

Computation of $I_u^{G+}$ Using Available SINRs

The code power to interference ratio is, $$(C/I)_u^{G+} = \frac{S_u^{G+}}{I_u^{G+} + N_u^{G+}}, u = 1, \ldots, U \quad (B18)$$

It can be noted that in (B18), all quantities except $I_u^{G+}$ have been computed, see (B11) and (B13). Using these quantities, (B18) can be solved for $I_u^{G+}$, giving $$I_u^{G+} = \frac{S_u^{G+}}{(C/I)_u^{G+}} - \kappa_u^{G+}\hat{N}, u = 1, \ldots, U \quad (B19)$$

The quantity $(C/I)_u^{G+}$ can be directly related to SINR. This is performed as $$(C/I)_u^{G+} = \frac{(\beta_{u,DPCCH}^2 + \beta_{u,EDPCCH}^2 + n_{u,codes}\beta_{u,EDPDCH}^2)}{\beta_{u,DCCH}^2 SF_{u,DPCCH}} SINR_u^{G+} = \quad (B20)$$

$$\frac{\beta_{u,effective}^2}{SF_{u,DPCCH}} SINR_u^{G+}$$

which gives $$I_u^{G+} = \frac{S_u^{G+}}{(C/I)_u^{G+}} - \kappa_u^{G+}\hat{N} = \frac{SF_{u,DPCCH}}{\beta_{u,effective}^2} \frac{S_u^{G+}}{SINR_u^{G+}} - \kappa_u^{G+}\hat{N}. \quad (B21)$$

Computation of $RoT_u^{G+}$

When (B9), (B13) and (17) are inserted in (B5), the end result becomes $$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right), \quad (B22)$$

$$u = 1, \ldots, U.$$

These measures, for each user u, are then combined into an uplink measure as outlined below. Note that (B22) provides some interesting insights. When SINR is high then the RoT for the user is essentially determined by the remaining own power of the user—the RoT then increases when the SINR gets worse.

Uplink Load Measure for G-Rake+

It is clear that that the user that sees the maximum total load is the one worst off in terms of coverage and stability. That user is hence used to address the load of the UL of the cell. The worst-case load is defined by the equations $$u_{max} = \underset{u}{\operatorname{argmax}}(RoT_u^{G+}) \quad (B23)$$

$$\max(RoT_u^{G+}) = RoT_{u_{max}}^{G+} \quad (B24)$$

ANNEX C

G-Rake+ Noise Rise and Stability

A Load Measure Directly Assessing Cell Stability after Grake+ Processing

As stated above the RoT is a general load measure in WCDMA systems. Since it includes the neighbor cell interference, it e.g. captures coverage effects of load changes. However, sometimes it is desirable to have access to load measures that directly assess the stability only of the serving cell. The purpose of the present section is to define a measure that addresses this need.

To achieve this goal it can be noted that in normal operation the uplink cell stability is mainly affected by the powers that are under inner loop power control, by the RBS. This is not perfectly true though, remembering that the inner loop power control loops are nonlinear and coupled and therefore it is not easily guaranteed that large neighbor cell power increases may not affect the cell stability after all. Put otherwise, cell stability is coupled to feasibility, which under certain conditions is tied to the RoT.

The above discussion is however somewhat idealized. First, the feasibility analysis is normally based on assumptions that the uplink is shared by a relatively large number of users, allowing interferers to be treated as noise sources. Secondly, the rise over thermal after G-Rake+ processing is an individual measure for each user—no formal proof is available on its precise relation to the uplink cell load and the cell stability issue. For this reason, it seems reasonable to address also other measures than the RoT.

In order to obtain a noise rise measure for stability the neighbor cell interference can be subtracted from the RoT of (B5), to yield $$NR_u^{G+} \equiv \frac{S_u^{G+} + I_u^{G+} + \kappa_u^{G+}\hat{N} - I_{u,neighbor}^{G+}}{\kappa_u^{G+}\hat{N}}, u = 1, \ldots, U \quad (C1)$$

This load measure is valid for each user, after GRAKE+ processing.

Neighbor Cell Interference Estimation

In order to come up with an estimate of the neighbor cell interference after GRAKE+ processing ($I_{u,neighbor}^{G+}$) two simplifying assumptions are necessary.

These include

The own cell interference dominates over the neighbor cell interference. This assumption is surely not always true. However, it is when the own cell interference dominates that stability of the own cell is most at stake—hence the case with dominating neighbor cell interference is less relevant from a stability point of view.

The neighbor cell interference can be treated as generated by a white noise process.

Using these assumptions the neighbor cell interference can be treated as the thermal noise power floor, resulting in $$\hat{I}_{u,neighbor}^{G+} = \frac{1}{M}\sum_{m=1}^{M}\sum_{k=1}^{K}\left(\hat{w}_u^H I_{u,neighbor,k}^m\right)^H \hat{w}_u^H I_{u,neighbor,k}^m =$$

$$\frac{1}{M}\sum_{m=1}^{M}\sum_{k=1}^{K} tr\left(\left(\hat{w}_u^H I_{u,neighbor,k}^m\right)^H \hat{w}_u^H I_{u,neighbor,k}^m\right) =$$

$$\frac{1}{M}\sum_{m=1}^{M}\sum_{k=1}^{K} tr\left(\hat{w}_u^H I_{u,neighbor,k}^m \left(\hat{w}_u^H I_{u,neighbor,k}^m\right)^H\right) =$$

$$\frac{1}{M}\sum_{m=1}^{M}\sum_{k=1}^{K} tr\left(\hat{w}_u^H I_{u,neighbor,k}^m (I_{u,neighbor,k}^m)^H \hat{w}_u\right) =$$

$$tr\left(\sum_{k=1}^{K}\hat{w}_u^H\left(\frac{1}{M}\sum_{m=1}^{M} I_{u,neighbor,k}^m (I_{u,neighbor,k}^m)^H\right)\hat{w}_u\right)_{M\to\infty}$$

$$tr(\hat{w}_u^H E[I_{u,neighbor}(I_{u,neighbor})^H]\hat{w}_u) =$$

$$tr(\hat{w}_u^H (\hat{I}_{u,neighbor}) I \hat{w}_u) = \hat{w}_u^H \hat{w}_u \hat{I}_{u,neighbor}.$$

This gives $$I_{u,neighbor}^{G+} = \kappa_u^{G+}\hat{I}_{u,neighbor}, u=1,\ldots,U \quad (C3)$$

where $\hat{I}_{u,neighbor}^{G+}$ is the neighbor cell interference power as estimated before GRAKE+ processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before GRAKE+ processing followed by a scaling to achieve a neighbor cell interference value after GRAKE+ processing.

One set of means that allows for neighbor cell interference estimation before GRAKE+ processing has e.g. been defined in [2], where a quantity representing a sum of neighbor cell interference and thermal noise power is obtained. Since the noise power floor is also estimated, it follows that an estimate of the neighbor cell interference can be made available before GRAKE+ processing. Note that the solution in [2] requires that a RAKE receiver for each user is used as well, in order to obtain a measure of all own cell user powers.

The Cell Stability Load Measure for a User after Grake+ Interference Whitening

Using (B22), and (C1)-(C3) results in $$NR_u^{G+} \equiv \frac{S_u^{G+} + I_u^{G+} + \kappa_u^{G+}\hat{N} - I_{u,neighbor}^{G+}}{\kappa_u^{G+}\hat{N}} = \quad (C4)$$

$$\frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{neighbor}}{\hat{N}},$$

since before GRAKE+ processing the neighbor cell interference is independent of the user.

UL Load Measure for Cell Stability

It is clear that that the user that sees the maximum total load is the one worst off in terms of coverage and stability. That user is hence used to address the load of the UL of the cell. The worst case load is defined by the equations $$u_{max} = \underset{u}{\operatorname{argmax}}(NR_u^{G+}) \quad (C5)$$

$$\max(NR_u^{G+}) = NR_{u_{max}}^{G+} \quad (C6)$$

ANNEX D

FDPE RoT

The Signal after FDPE

Using Equations (3) and (8) results in $$Z_{pre}(m) = W_{pre}(m)H(m)Z(m) + W_{pre}(m)I(m) + W_{pre}(m)N^{thermal}(m) \quad (D1)$$

Here $Z_{pre}(m)$ denotes the pre-equalized wideband signal in the frequency domain, $W_{pre}(m)$ denotes the wideband pre-equalizing filter in the frequency domain, $H(m)$ denotes the wideband net channel response in the frequency domain, $Z(m)$ denotes the wideband transmitted signal in the frequency domain, $I(m)$ denotes the wideband neighbor cell interference in the frequency domain and $N^{thermal}(m)$ denotes the wideband thermal noise floor signal in the frequency domain. The equation (D1) is readily transformed to the time domain with an inverse discrete Fourier transformation, rendering $$z_{pre}(t) = (w_{pre}h)(t)*z(t) + w_{pre}(t)*i(t) + w_{pre}(t)*n^{thermal}(t) \quad (D2)$$

where the star denotes (multi-dimensional) convolution $z_{pre}$(t) denotes the pre-equalized wideband signal in the time domain, $w_{pre}$(t) denotes the wideband finite impulse response of the pre-equalizing filter in the time domain, h(t) denotes the wideband finite impulse response net channel response in the time domain, z(t) denotes the wideband transmitted signal in the time domain, i(t) denotes the wideband neighbor cell interference in the time domain and $n^{thermal}$(t) denotes the wideband thermal noise floor signal in the time domain. It is important to understand that all signal quantities are here given before the pre-equalization step.

Measuring Load after FDPE
Load Definition

To obtain a measure of the load after FDPE interference whitening the RoT after this step is considered. This is in fact more appealing than for the G-rake+ receiver in that the whole uplink load is addressed at the same time. The RoT measure after FDPE processing is given by $$RoT^{FDPE}(t) = \frac{z_{pre}^H(t)z_{pre}(t)}{E[(w_{pre}(t)*n^{thermal}(t))^H(w_{pre}(t)*n^{thermal}(t))]} \quad (D3)$$

Computation of the Numerator of (D3)

The numerator of (D3) is straightforward to compute. Noting that the time scale for the RoT measurement in WCDMA is normally a transmission time interval (TTI), it follows that the numerator of (D3) can be computed e.g. by an average of time samples over the TTI of interest (typically 2 ms or 10 ms).

Computation of the Denominator of (D3)

The computation of the denominator of (D3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_{pre}(t)*n^{thermal}(t))^H(w_{pre}(t)*n^{thermal}(t))\right] = \quad (D4)$$

$$E\left[\sum_{l_1=0}^{L-1}(n^{thermal}(t-l_1))^H w_{pre}^H(l_1)\sum_{l_2=0}^{L-1}w_{pre}(l_2)n^{thermal}(t-l_2)\right] =$$

$$E\left[\sum_{l_1=0}^{L-1}\sum_{l_2=0}^{L-1}(n^{thermal}(t-l_1))^H w_{pre}^H(l_1)w_{pre}(l_2)n^{thermal}(t-l_2)\right] =$$

$$E\left[\sum_{l_1=0}^{L-1}\sum_{l_2=0}^{L-1}w_{pre}^H(l_1)w_{pre}(l_2)(n^{thermal}(t-l_1))^H n^{thermal}(t-l_2)\right] =$$

$$\sum_{l_1=0}^{L-1}\sum_{l_2=0}^{L-1}w_{pre}^H(l_1)w_{pre}(l_2)E\left[(n^{thermal}(t-l_1))^H n^{thermal}(t-l_2)\right]$$

$$\sum_{l_1=0}^{L-1}\sum_{l_2=0}^{L-1}w_{pre}^H(l_1)w_{pre}(l_2)\delta_{l_1,l_2}\sum_{a=1}^{A}\hat{N}_a^{thermal} =$$

$$\left(\sum_{l=0}^{L-1}w_{pre}^H(l)w_{pre}(l)\right)\left(\sum_{a=1}^{A}\hat{N}_a^{thermal}\right)$$

In (D4) $\hat{N}_a^{thermal}$ denotes the estimated thermal noise floor of antenna branch a, before pre-equalization. This means that prior art noise floor estimation algorithms of [1]-[3] can be re-used. One algorithm is needed for each antenna branch.

Load Estimate and Block Diagram

Combining (D3) and (D4) results in $$RoT^{FDPE} = \frac{z_{pre}^H(t)z_{pre}(t)}{\left(\sum_{l=0}^{L-1}w_{pre}^H(l)w_{pre}(l)\right)\left(\sum_{a=1}^{A}\hat{N}_a^{thermal}\right)} \quad (D5)$$

The quantities above should be computed as averages or estimates over a time interval where the whitening filter of the FDOE remains constant. The result is intuitive. Since the received total wideband power is summed over all antenna branches, so is the thermal noise power floor. The RoT after FDPE is also scaled with the power of the pre-whitening filter. A block diagram of the load estimation solution is depicted in FIG. 7. Only the FDPE blocks are shown there.

ANNEX E

FDPE Noise Rise for Stability

Measuring Stability Related Load after FDPE
Load Definition

To obtain a measure of the load after the FDPE interference whitening, the RoT after this step is first considered. The RoT measure after FDPE processing is given by $$RoT^{FDPE}(t) = \frac{z_{pre}^H(t)z_{pree}(t)}{E[(w_{pre}(t)*n^{thermal}(t))^H(w_{pre}(t)*n^{thermal}(t))]} \quad (E1)$$

In order to address the stability related load the neighbor cell interference, as seen after the FDPE processing needs to be subtracted from the numerator. This follows since the neighbor cell interference does not affect the stability of the own cell since the neighbor cell interference is not controlled by said first cell, i.e.

$$NR^{FDE}(t) = \frac{z_{pre}^H(t)z_{pre}(t) - \hat{I}_{pre}^{neighbor}(t)}{E[(w_{pre}(t)*n^{thermal}(t))^H(w_{pre}(t)*n^{thermal}(t))]} \quad (E2)$$

where $\hat{I}_{pre}^{neighbor}(t)$ is the neighbor cell interference as seen after FDPE processing.

Computation of the First Part of the Numerator of (23)

The first part of the numerator of (E2) is computed as in Annex D.

Neighbor Cell Interference Estimation

In order to come up with an estimate of the neighbor cell interference after FDPE processing ($\hat{I}_{pre}^{neighbor}$) two simplifying assumptions are necessary. These include The own cell interference dominates over the neighbor cell interference. This assumption is surely not always true. However, it is when the own cell interference dominates that stability of the own cell is most at stake—hence the case with dominating neighbor cell interference is less relevant from a stability point of view.

The neighbor cell interference can be treated as generated by a white noise process.

Using these assumptions the neighbor cell interference can be treated as the thermal noise power floor, resulting in $$\hat{I}_{pre}^{neighbor}(t) = E\left[(w_{pre}(t)*i^{neighbor}(t))^H(w_{pre}(t)*i^{neighbor}(t))\right] = \quad (E3)$$

$$E\left[\sum_{l_1=0}^{L-1}(i^{neighbor}(t-l_1))^H w_{pre}^H(l_1)\sum_{l_2=0}^{L-1}w_{pre}(l_2)i^{neighbor}(t-l_2)\right] =$$

$$E\left[\sum_{l_1=0}^{L-1}\sum_{l_2=0}^{L-1}(i^{neighbor}(t-l_1))^H w_{pre}^H(l_1)w_{pre}(l_2)i^{neighbor}(t-l_2)\right] =$$

$$E\left[\sum_{l_1=0}^{L-1}\sum_{l_2=0}^{L-1}w_{pre}^H(l_1)w_{pre}(l_2)(i^{neighbor}(t-l_1))^H i^{neighbor}(t-l_2)\right] =$$

$$\sum_{l_1=0}^{L-1}\sum_{l_2=0}^{L-1}w_{pre}^H(l_1)w_{pre}(l_2)E\left[(i^{neighbor}(t-l_1))^H i^{neighbor}(t-l_2)\right]$$

$$\sum_{l_1=0}^{L-1}\sum_{l_2=0}^{L-1}w_{pre}^H(l_1)w_{pre}(l_2)\delta_{l_1,l_2}\hat{I}^{neighbor}(t) = \sum_{l=0}^{L-1}w_{pre}^H(l)w_{pre}(l)\hat{I}^{neighbor}(t)$$

Here $\hat{I}_{pre}^{neighbor}(t)$ is the neighbor cell interference power as estimated before FDPE processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before FDPE processing followed by a scaling to achieve a neighbor cell interference value after FDPE processing.

One set of means that allows for neighbor cell interference estimation before FDPE processing has e.g. been defined in [2], where a quantity representing a sum of neighbor cell interference and thermal noise power is obtained. Since the noise power floor is also estimated it follows that an estimate of the neighbor cell interference can be made available before FDPE processing. Note that the solution in [2] requires that a RAKE receiver for each user is used as well, in order to obtain a measure of all own cell user powers.

Computation of the Denominator of (E2)

The computation of the denominator of (E2) is performed as in Annex D.

Load Estimate

Combining (E2), (E3) and (D4) results in $$NR^{FDPE}(t) = \frac{z_{pre}^H(t)z_{pre}(t) - \left(\sum_{l=0}^{L-1} w^H(l)w(l)\right)\hat{I}^{neighbor}(t)}{\left(\sum_{l=0}^{L-1} w_{pre}^H(l)w_{pre}(l)\right)\left(\sum_{a=1}^{A} \hat{N}_a^{thermal}\right)} = \quad (D4)$$

$$\frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}$$

The quantities above should be computed as averages or estimates over a time interval where the interference suppressing filter of the FDPE remains constant. The result is intuitive. Since the received total wideband power is summed over all antenna branches, so is the thermal noise power floor. The RoT after FDPE is also scaled with the power of the equalizing filter.

ANNEX F

FDE RoT

The Signal after FDE

Using (10) and (12) results in $$Z_{FDE}(m)=W(m)H(m)Z(m)+W(m)I(m)+W(m)N^{thermal}(m) \quad (F1)$$

Here $Z_{FDE}(m)$ denotes the pre-equalized wideband signal in the frequency domain, W(m) denotes the wideband MMSE equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. All signals are vector valued. The equation (F1) is readily transformed to the time domain with an inverse discrete Fourier transformation, rendering $$Z_{FDE}(t)=(wh)(t)*z(t)+w(t)*i(t)+w(t)*n^{thermal}(t) \quad (F2)$$

where the star denotes (multi-dimensional) convolution, $z_{pre}(t)$ denotes the equalized wideband signal in the time domain, w(t) denotes the wideband finite impulse response of the equalizing filter in the time domain, h(t) denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain.

Measuring Load after FDE

The Signal after FDE

Using (10) and (12) results in the following equation, where u denotes user U $$Z_{FDE,u}(m)=W_u(m)H_u(m)Z(m)+W_u(m)I(m)+W_u(m)N^{thermal}(m) \quad (F1)$$

Here $Z_{FDE,u}(m)$ denotes the pre-equalized wideband signal in the frequency domain, $W_u(m)$ denotes the wideband MMSE equalizing filter in the frequency domain, $H_u(m)$ denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. All signals are vector valued. The equation (F1) is readily transformed to the time domain with an inverse discrete Fourier transformation, rendering $$z_{FDE,u}(t)=(w_u h_u)(t)*z(t)+w_u(t)*i(t)+w_u(t)*n^{thermal}(t) \quad (F2)$$

where the star denotes (multi-dimensional) convolution, $Z_{pre,u}(t)$ denotes the equalized wideband signal in the time domain, $w_u(t)$ denotes the wideband finite impulse response of the equalizing filter in the time domain, $h_u(t)$ denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain.

Measuring Load after FDE

Load Definition

To obtain a measure of the load after the FDE interference whitening, the RoT after this step is considered. The RoT measure after FDE processing is given by $$RoT_u^{FDE}(t) = \frac{z_{FDE,u}^H(t)z_{FDE,u}(t)}{E[(w_u(t)*n^{thermal}(t))^H(w_u(t)*n^{thermal}(t))]} \quad (F3)$$

Computation of the Numerator of (F3)

The numerator of (F3) is straightforward to compute. Noting that the time scale for the RoT measurement in WCDMA is normally a transmission time interval (TTI), it follows that the numerator of (8) can be computed e.g. by an average of time samples over the TTI of interest (typically 2 ms or 10 ms).

Computation of the Denominator of (F3)

The computation of the denominator of (F3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E\left[(w_u(t)*n^{thermal}(t))^H(w_u(t)*n^{thermal}(t))\right] = \quad (F4)$$

$$E\left[\sum_{l_1=0}^{L-1}(n^{thermal}(t-l_1))^H w_u^H(l_1)\sum_{l_2=0}^{L-1}w_u(l_2)n^{thermal}(t-l_2)\right] =$$

$$E\left[\sum_{l_1=0}^{L-1}\sum_{l_2=0}^{L-1}(n^{thermal}(t-l_1))^H w_u^H(l_1)w_u(l_2)n^{thermal}(t-l_2)\right] =$$

$$E\left[\sum_{l_1=0}^{L-1}\sum_{l_2=0}^{L-1}w_u^H(l_1)w_u(l_2)(n^{thermal}(t-l_1))^H n^{thermal}(t-l_2)\right] =$$

$$\sum_{l_1=0}^{L-1}\sum_{l_2=0}^{L-1}w_u^H(l_1)w_u(l_2)E\left[(n^{thermal}(t-l_1))^H n^{thermal}(t-l_2)\right]$$

-continued $$\sum_{l_1=0}^{L-1}\sum_{l_2=0}^{L-1} w_u^H(l_1)w_u(l_2)\delta_{l_1,l_2}\sum_{a=1}^{A}\hat{N}_a^{thermal} =$$

$$\left(\sum_{l_1=0}^{L-1} w_u^H(l)w_u(l)\right)\left(\sum_{a=1}^{A}\hat{N}_a^{thermal}\right)$$

In (F4) $\hat{N}_a^{thermal}$ denotes the estimated thermal noise floor of antenna branch a, before pre-equalization. This means that prior art noise floor estimation algorithms of [1]-[3] can be re-used. One algorithm is needed for each antenna branch.

Load Estimate

Combining (F3) and (F4) results in $$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A}\hat{N}_a^{thermal}\right)}, u=1,\ldots,U \quad (F5)$$

The quantities above should be computed as averages or estimates over a time interval where the equalizing filter of the FDE remains constant. The result is intuitive. Since the received total wideband power is summed over all antenna branches, so is the thermal noise power floor. The RoT after FDE is also scaled with the power of the equalizing filter.

Combination of Users

The above discussion has focused on a single user. However, what is interesting is a load measure for the complete uplink. Since it is likely that it is the user that experiences the highest load that limits the uplink, the uplink load is defined to be $$RoT = \max_{u} RoT_u^{FDE}, \quad (F6)$$

where $RoT_u^{FDE}$ is the noise rise of user u.

ANNEX G

FDE Noise Rise for Stability

Measuring Stability Related Load after FDE
Load Definition

To obtain a measure of the load after the FDE interference whitening, the RoT after this step is first considered. The RoT measure after FDE processing is given by $$RoT_u^{FDE}(t) = \frac{z_{FDE,u}^H(t)z_{FDE,u}(t)}{E[(w_u(t)*n^{thermal}(t))^H(w_u(t)*n^{thermal}(t))]} \quad (G1)$$

In order to address the stability related load the neighbor cell interference, as seen after the FDE processing needs to be subtracted from the numerator. This follows since the neighbor cell interference does not affect the stability of the own cell since the neighbor cell interference is not controlled by said first cell, i.e.

$$NR_u^{FDE}(t) = \frac{z_{FDE,u}^H(t)z_{FDE,u}(t) - \hat{I}_{FDE,u}^{neighbor}(t)}{E[(w_u(t)*n^{thermal}(t))^H(w(t)*n^{thermal}(t))]} \quad (G2)$$

where $\hat{I}_{FDE,u}^{neighbor}(t)$ is the neighbor cell interference—again experienced by a specific user.

Computation of the First Part of the Numerator of (G2)

The first part of the numerator of (G2) is computed as in Annex F.

Neighbor Cell Interference Estimation

In order to come up with an estimate of the neighbor cell interference after FDE processing ($\hat{I}_{FDE,u}^{neighbor}$) two simplifying assumptions are necessary. These include The own cell interference dominates over the neighbor cell interference. This assumption is surely not always true. However, it is when the own cell interference dominates that stability of the own cell is most at stake—hence the case with dominating neighbor cell interference is less relevant from a stability point of view.

The neighbor cell interference can be treated as generated by a white noise process.

Using these assumptions the neighbor cell interference can be treated as the thermal noise power floor, resulting in $$\hat{I}_{FDE,u}^{neighbor}(t) = E\left[(w_u(t)*i^{neighbor}(t))^H(w_u(t)*i^{neighbor}(t))\right] = \quad (G3)$$

$$E\left[\sum_{l_1=0}^{L-1}(i^{neighbor}(t-l_1))^H w_u^H(l_1)\sum_{l_2=0}^{L-1} w_u(l_2)i^{neighbor}(t-l_2)\right] =$$

$$E\left[\left(\sum_{l_1=0}^{L-1}\sum_{l_2=0}^{L-1}(i^{neighbor}(t-l_1))^H w_u^H(l_1)w_u(l_2)i^{neighbor}(t-l_2)\right)\right] =$$

$$E\left[\sum_{l_1=0}^{L-1}\sum_{l_2=0}^{L-1} w_u^H(l_1)w_u(l_2)(i^{neighbor}(t-l_1))^H i^{neighbor}(t-l_2)\right] =$$

$$\sum_{l_1=0}^{L-1}\sum_{l_2=0}^{L-1} w_u^H(l_1)w_u(l_2)E\left[(i^{neighbor}(t-l_1))^H i^{neighbor}(t-l_2)\right]$$

$$\sum_{l_1=0}^{L-1}\sum_{l_2=0}^{L-1} w_u^H(l_1)w_u(l_2)\delta_{l_1,l_2}\hat{i}^{neighbor}(t) = \sum_{l=0}^{L-1} w_u^H(l)w_u(l)\hat{i}^{neighbor}(t)$$

Here $\hat{I}^{neighbor}(t)$ is the neighbor cell interference power as estimated before FDE processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before FDE processing followed by a scaling to achieve a neighbor cell interference value after FDE processing.

One set of means that allows for neighbor cell interference estimation before FDE processing has e.g. been defined in [2], where a quantity representing a sum of neighbor cell interference and thermal noise power is obtained. Since the noise power floor is also estimated it follows that an estimate of the neighbor cell interference can be made available before FDE processing.

Note that the solution in [2] requires that a RAKE receiver for each user is used as well, in order to obtain a measure of all own cell user powers.

Computation of the Denominator of (G2)

The computation of the denominator of (G2) is performed as in Annex F.

Load Estimate

Combining (F4), (G2) and (G3) results in $$NR_u^{FDE}(t) = \frac{z_{FDE,u}^H(t)z_{FDE,u}(t) - \left(\sum_{l=0}^{L-1} w_u^H(l)w_u(l)\right)\hat{I}^{neighbor}(t)}{\left(\sum_{l=0}^{L-1} w_u^H(l)w_u(l)\right)\left(\sum_{a=1}^{A} \hat{N}_a^{thermal}\right)} = \qquad (G4)$$

$$\frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}$$

The quantities above should be computed as averages or estimates over a time interval where the equalizing filter of the FDE remains constant. The result is intuitive. Since the received total wideband power is summed over all antenna branches, so is the thermal noise power floor. The RoT after FDE is also scaled with the power of the equalizing filter.

Combination of Users

The above discussion has focused on a single user. However, what is interesting is a load measure for the complete uplink. Since it is likely that it is the user that experiences the highest load that limits the uplink, the uplink load relevant for stability is defined to be $$NR^{FDE} = \max_u NR_u^{FDE} \qquad (G5)$$

where $NR_u^{FDE}$ is the noise rise of user u.

What is claimed is:

1. A method of providing load measurements in an interference suppression capable radio base station node associated with a plurality of users in a heterogeneous wireless communication system, the method comprising:
    applying, in said radio base station node, interference suppression to received signals in said radio base station node, to provide interference suppressed received signals;
    estimating, in said radio base station node, neighbor cell interference based on said interference suppressed received signals;
    estimating, in said radio base station node, a reference received total wideband power, based on said interference suppressed received signals,
    determining, in said radio base station node, a first load measure based on said interference suppressed received signals and said estimated reference received total wideband power; and
    determining in said radio base station node, a second load measure based on said interference suppressed received signals, said estimated reference received total wideband power and said estimated neighbor cell interference.

2. The method according to claim 1, further comprising signaling said first load measure, said second load measure, and said estimated reference received total wideband power to another node in the wireless communication system.

3. The method according to claim 2, further comprising signaling said first and said second load measures alternately.

4. The method according to claim 2, further comprising signaling said first and said second load measures jointly.

5. The method according to claim 2, wherein:
    said determining said first load measure comprises estimating a rise over thermal value for said interference suppressed received signals based on said interference suppressed received signals and said estimated reference received total wideband power and transforming said estimated rise over thermal value into a first estimate of a received total wideband power, and said estimate of said reference received total wideband power;
    said determining said second load measure comprises estimating a noise rise value for said interference suppressed received signals interference suppressed received signals, said estimated reference received total wideband power, and said estimated neighbor cell interference, and transforming said estimated noise rise value into a second estimate of a received total wideband power; and
    said signaling comprises signaling said estimated first received total wideband power as said first load measure, and signaling said estimated second received total wideband power as said second load measure, and said referenced received total wideband power.

6. The method according to claim 5, wherein
    said estimating a rise over thermal value comprises estimating a respective rise over thermal value for each of said plurality of users;
    said method further comprises the step of selecting a highest rise over thermal value of said respective estimated rise over thermal values to represent the rise over thermal value;
    said determining said first load measure is based on said selected rise over thermal value;
    said estimating a noise rise value comprises estimating a respective noise rise value for each of said plurality of users;
    said method further comprises the step of selecting a highest noise rise value to represent the noise rise; and
    said determining said second load measure is based on said selected noise rise value.

7. The method according to claim 6, wherein said interference suppressing capability in said radio base station node is achieved by a G-rake+ receiver.

8. The method according to claim 7, wherein said rise over thermal value RoT for each respective user u is determined further based on an estimated noise floor prior to interference suppression and SINR for user u after interference suppression, and said noise rise value for each respective user u is determined further based on said estimated neighbor cell interference.

9. The method according to claim 8, wherein said estimating a respective rise over thermal value RoT for each of said plurality of users is performed according to:

$$RoT_u^{G+} = \frac{S_u^{G+}}{\kappa_u^{G+}\hat{N}}\left(1 + \frac{SF_{u,DPCCH}}{\beta_{u,effective}^2}\frac{1}{SINR_u^{G+}}\right)$$

where
$RoT_u^{G+}$=rise over thermal for user u after interference suppression
$S_u^{G+}$=signal power for user u
$\kappa_u^{G+}$=scale factor for user u
$\hat{N}$=estimated noise floor prior to interference suppression $SF_{u,DPCCH}$=spreading factor of the DPCCH channel for user u $\beta_{u,effective}^2$=total effective beta factor squared (data power offset) for user u $SINR_u^{G+}$=SINR for user u after interference suppression and said selecting a highest rise over thermal value is performed according to $$u_{max} = \underset{u}{\mathrm{argmax}}(RoT_u^{G+})$$

and said determining a first load measure is performed according to max $(RoT_u^{G+})=RoT_{u_{max}}^{G+}$ and said estimating a respective noise rise value for said plurality of users is performed according to:

$$NR_u^{G+} = \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) - \frac{\hat{I}_{neighbor}}{\hat{N}},$$

$u = 1, \ldots, U$ and said selecting a highest noise rise value is performed according to $$u_{max} = \underset{u}{\mathrm{argmax}}(NR_u^{G+})$$

and said determining second load measure is performed according to max$(NR_u^{G+})=NR_{u_{max}}^{G+}$ where $\hat{I}_{neighbor}$ is the estimated neighbor cell interference.

10. The method according to claim 6, wherein said interference suppressing capability in said radio base station node is achieved by a frequency domain equalization (FDE) receiver.

11. The method according to claim 10, wherein:

said estimating a respective rise over thermal value RoT for each of said plurality of users is further based on pre-equalized wideband signal for user u in the time domain, a wideband finite impulse response of the equalizing filter in the time domain for user u, and an estimated thermal noise floor of antenna branch a in the time domain, before equalization; and said estimating a respective noise rise for each of said plurality of users is further based on pre-equalized wideband signal for user u in the time domain, a wideband finite impulse response of the equalizing filter in the time domain for user u, and an estimated thermal noise floor of antenna branch a in the time domain, before equalization, and on said estimated neighbor cell interference.

12. The method according to claim 11, wherein:

said estimating a respective rise over thermal value RoT for each of said plurality of users u is performed according to $$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)},$$

$u = 1, \ldots, U$ where $RoT_u^{FDE}$=rise over thermal for user u after interference suppression $z_{FDE,u}(t)$=pre-equalized wideband signal for user u in the time domain, $w_u(l)$=wideband finite impulse response of the equalizing filter in the time domain for user u;

$\hat{N}_a^{thermal}$=estimated thermal noise floor of antenna branch a in the time domain, before equalization;

said selecting a highest rise over thermal value is performed according to $$u_{max} = \underset{u}{\mathrm{argmax}}(RoT_u^{FDE});$$

and said determining a first load measure is performed according to max$(RoT_u^{FDE})=RoT_{u_{max}}^{FDE}$; and said estimating a respective noise rise value for each of said plurality of users u is performed according to $$NF_u^{FDE}(t) = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)};$$

and said step of selecting a highest noise rise value is performed according to $$NF^{FDE}(t) = \underset{u}{\max} NF_u^{FDE}(t)$$

where $\hat{I}_{neighbor}$ is the estimated neighbor cell interference.

13. The method according to claim 5, wherein said interference suppressing capability in said radio base station node is achieved by a frequency pre equalization (FDPE) receiver.

14. The method according to claim 13, wherein:

said estimating a rise over thermal value RoT is further based on a pre-equalized wideband signal in the time domain, a wideband finite impulse response of the pre-equalizing filter in the time domain, and an estimated thermal noise floor of antenna branch a in the time domain, before pre-equalization; and said estimating a noise rise is further based on a pre-equalized wideband signal in the time domain, a wideband finite impulse response of the pre-equalizing filter in the time domain, and an estimated thermal noise floor of antenna branch a in the time domain, before pre-equalization, and on said estimated neighbor cell interference.

15. The method according to claim 14, wherein:

said estimating a rise over thermal value RoT for said interference suppressed received signals is performed according to $$RoT^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)}$$

where $RoT^{FDPE}$=rise over thermal for the interference suppressed received signals after interference suppression $z_{pre}(t)$=pre-equalized wideband signal in the time domain,
$w_{pre}(l)$=wideband finite impulse response of the pre-equalizing filter in the time domain, and
$\hat{N}_a^{thermal}$=estimated thermal noise floor of antenna branch a in the time domain, before pre-equalization; and
said estimating a noise rise value for said interference suppressed received signals is performed according to $$NF^{FDPE}(t) = \frac{z_{pre}^H(t) z_{pre}(t)}{\left(\sum_{l=0}^{L-1} w_{pre}^H(l) w_{pre}(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}$$

where $\hat{I}_{neighbor}$ is the estimated neighbor cell interference.

16. The method according to claim 2, wherein said interference suppressing capability in said radio base station node is achieved by a linear receiver.

17. The method according to claim 1, wherein said estimating said neighbor cell interference based on said interference suppressed received signals comprises estimating neighbor cell interference based on received signals prior to interference suppression, and transforming said estimate into an estimate of neighbor cell interference after interference suppression.

18. An arrangement for providing load measurements in a radio base station node associated with a plurality of users in a heterogeneous wireless communication system, the arrangement comprising:
an interference suppression unit configured to apply interference suppression to received signals in said radio base station node, to provide interference suppressed received signals;
a neighbor cell interference estimator unit configured for estimating neighbor cell interference based on said interference suppressed received signals;
a reference received total wideband power estimator unit configured for estimating a reference received total wideband power, based on said interference suppressed received signals;
a first load measure determining unit configured for determining a first load measure based on said interference suppressed received signals and said estimated reference received total wideband power; and
a second load measure determining unit configured for determining a second load measure based on said interference suppressed received signals, said estimated reference received total wideband power, and said estimated neighbor cell interference.

19. The arrangement according to claim 18, further comprising
a signaling unit configured for signaling said first and said second load measure and said estimated reference received total wideband power to another node in the wireless communication system.

20. The arrangement according to claim 19, wherein
said first load determining unit is configured to determine said first load measure by estimating a rise over thermal value for said interference suppressed received signals based on said interference suppressed received signals and said estimated reference received total wideband power and transforming said rise over thermal estimate into a first estimate of a received total wideband power, and said estimate of said reference received total wideband power; and
said second load determining unit is configured to determine said second load measure by estimating a noise rise value for said interference suppressed received signals interference suppressed received signals, said estimated reference received total wideband power, and said estimated neighbor cell interference, and transforming said noise rise estimate into a second estimate of a received total wideband power; and
said signaling unit is configured to signal said estimated first received total wideband power as said first load measure, and to signal said estimated second received total wideband power as said second load measure.

21. The arrangement according to claim 20, wherein said arrangement is based on an FDPE receiver.

22. The arrangement according to claim 19, wherein:
said first determining unit is configured to estimate a rise over thermal value by estimating a respective rise over thermal value for each of said plurality of users and selecting a highest rise over thermal value of said respective estimated rise over thermal values to represent the rise over thermal value, and to determine said first load measure based on said selected rise over thermal value,
said second determining unit is configured to estimate a noise rise by estimating a respective noise rise for each of said plurality of users, and to select a highest noise rise to represent the noise rise, and to determine said second load measure based on said selected noise rise.

23. The arrangement according to claim 22 wherein said arrangement is based on a G-rake+ receiver.

24. The arrangement according to claim 22, wherein said arrangement is based on an FDE receiver.

25. The arrangement according to claim 18, wherein said arrangement is based on a linear receiver.

* * * * *

UNITED STATES PATENT AND TRADEMARK OFFICE
CERTIFICATE OF CORRECTION

PATENT NO. : 8,717,924 B2
APPLICATION NO. : 13/306483
DATED : May 6, 2014
INVENTOR(S) : Wigren et al.

It is certified that error appears in the above-identified patent and that said Letters Patent is hereby corrected as shown below:

In the Drawings

Figure 12:
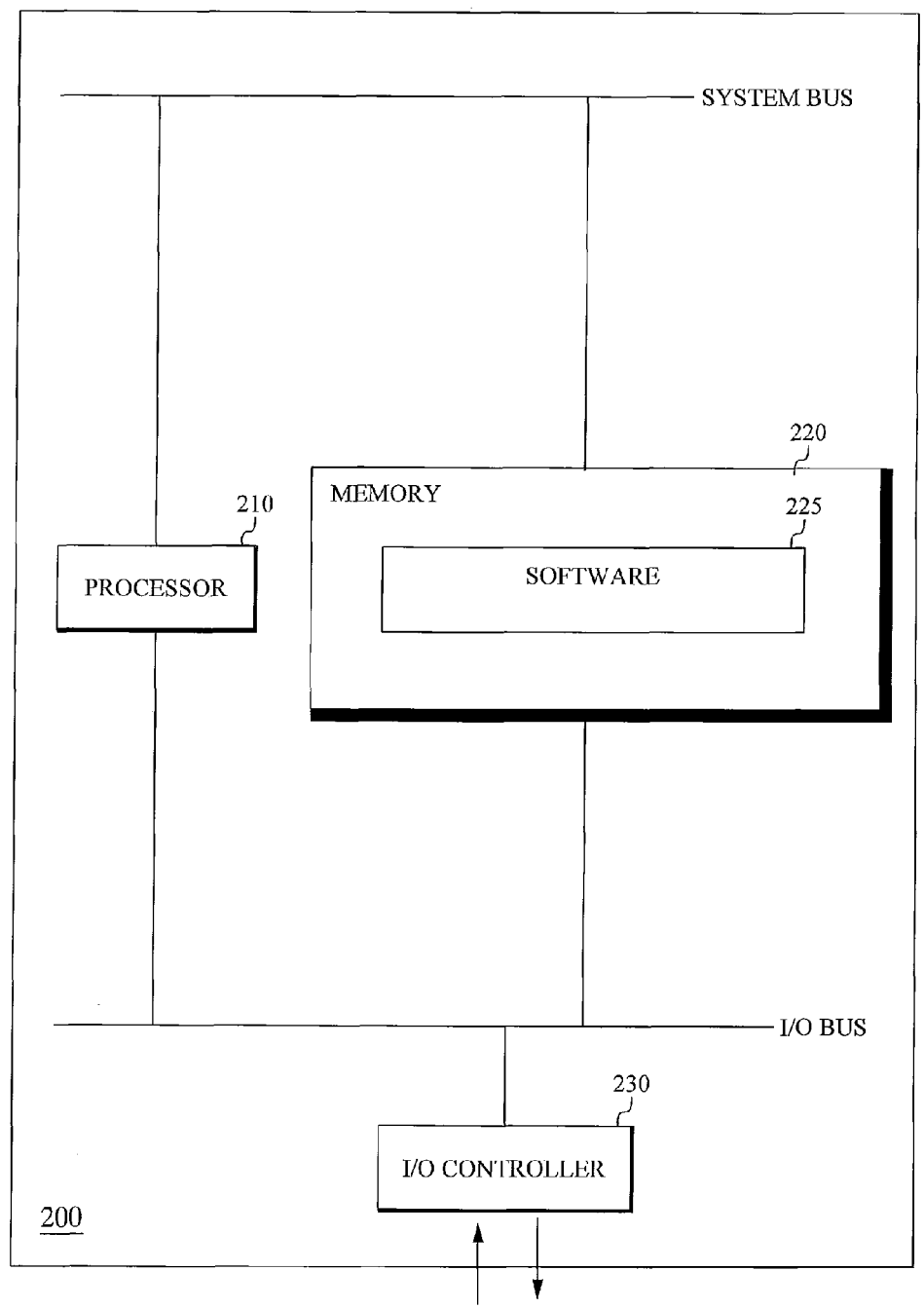
FIG. 12 is a schematic illustration of a computer implementation of the present disclosure.

In Fig. 12, Sheet 12 of 12, delete " 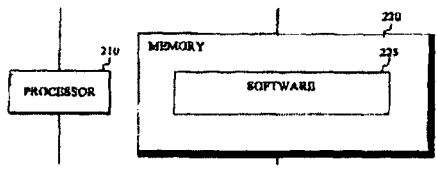 " and insert -- 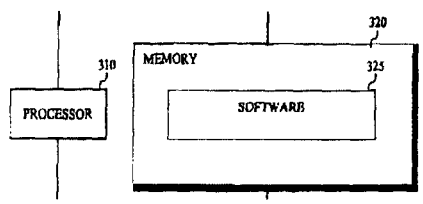 --, therefor.

In Fig. 12, Sheet 12 of 12, delete " 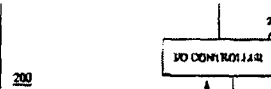 " and insert --  --, therefor.

In the Specification

In Column 4, Line 29, delete "ar" and insert -- a --, therefor.

In Column 25, Lines 34-35, Equation (B20), delete " $\frac{(\beta_{u,DPCCH}^2 + \beta_{u,EDPCCH}^2 + n_{u,codes}\beta_{u,EDPDCH}^2)}{\beta_{u,DCCH}^2 SF_{u,DPCCH}} SINR_u^{C+}$ " and insert -- $\frac{(\beta_{u,DPCCH}^2 + \beta_{u,EDPCCH}^2 + n_{u,codes}\beta_{u,EDPDCH}^2)}{\beta_{u,DPCCH}^2 SF_{u,DPCCH}} SINR_u^{C+}$ --, therefor.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,717,924 B2

In Column 29, Line 40, delete "FDOE" and insert -- FDPE --, therefor.

In Column 29, Line 57, Equation (E1), delete "$\frac{z_{pre}^{H}(t)z_{pre}(t)}{E[(w_{pre}(t)*n^{thermal}(t))^{H}(w_{pre}(t)*n^{thermal}(t))]}$" and insert -- $\frac{z_{pre}^{H}(t)z_{pre}(t)}{E[(w_{pre}(t)*n^{thermal}(t))^{H}(w_{pre}(t)*n^{thermal}(t))]}$ --, therefor.

In the Claims

In Column 38, Line 40, in Claim 13, delete "frequency" and insert -- frequency domain --, therefor.